United States Patent [19]
Fuchigami et al.

[11] Patent Number: 5,960,398
[45] Date of Patent: Sep. 28, 1999

[54] COPYRIGHT INFORMATION EMBEDDING APPARATUS

[75] Inventors: Norihiko Fuchigami, Yamato; Shoji Ueno; Yoshiaki Tanaka, both of Fujisawa, all of Japan

[73] Assignee: Wictor Company of Japan, Ltd., Yokohama, Japan

[21] Appl. No.: 08/901,712

[22] Filed: Jul. 28, 1997

[30] Foreign Application Priority Data

Jul. 31, 1996 [JP] Japan .................................. 8-217997
Jul. 31, 1996 [JP] Japan .................................. 8217925

[51] Int. Cl.$^6$ ........................................... G10L 9/00
[52] U.S. Cl. ........................ 704/270; 704/205; 704/275; 360/60; 360/32; 360/64; 360/58; 369/275.3; 369/32
[58] Field of Search ................................ 704/205, 270, 704/200, 275; 360/60, 32, 48, 64, 58; 369/275.3, 32

[56] References Cited

U.S. PATENT DOCUMENTS

| | | | |
|---|---|---|---|
| 4,939,515 | 7/1990 | Adelson | 341/51 |
| 5,023,730 | 6/1991 | Sakata et al. | 360/48 |
| 5,130,864 | 7/1992 | Shimada | 360/60 |
| 5,319,735 | 6/1994 | Preuss et al. . | |
| 5,428,598 | 6/1995 | Veldhuis et al. | 369/275.3 |
| 5,530,751 | 6/1996 | Morris . | |
| 5,579,120 | 11/1996 | Oguro | 386/94 |

FOREIGN PATENT DOCUMENTS

| | | |
|---|---|---|
| 0298691 | 1/1989 | European Pat. Off. . |
| 0372601 | 6/1990 | European Pat. Off. . |
| 0418964 | 3/1991 | European Pat. Off. . |
| 8-45179 | 2/1996 | Japan . |
| 84 00635 | 2/1984 | WIPO . |

OTHER PUBLICATIONS

Bender, W., et al, "Techniques for data hiding", Proc. Spie, vol.2420, Jan. 1, 1995, pp. 164–173.
Boney et al., ("Digital Watermarks for audio signals", Proceedings of IEEE Multimedia '96, Jan. 1996, pp. 473–480).
Mintzer et al., (Digital Watermarking schemes based on vector quantization, IEEE 97, Jun. 1997, pp. 95–96).
Cox et al., ("Secure Spread Spectrum Watermarking for Multimedia", IEEE Transactions on Image Processing, vol. 6, No. 12, Dec. 1997, pp. 1673–1687).

*Primary Examiner*—David R. Hudspeth
*Assistant Examiner*—Vijay B. Chawan
*Attorney, Agent, or Firm*—Michael N. Meller

[57] ABSTRACT

A copyright information embedding system is provided which is designed to embed information for copyright protection into digital audio signals without deterioration of analog audio signals reproduced. The copyright information embedding system includes an A/D converter, a modulator, a level detector, and a copyright data embedding circuit. The A/D converter converts an analog audio signal into a digital signal. The modulator modulates a copyright data signal for the digital signal using spectrum spread. The level detector detects a variation in level of the digital signal. The copyright data embedding circuit divides the copyright data signal into several codes and embeds them into the digital signal each time the variation in level of the digital signal shows a preselected variation such as a rapid rise or drop.

25 Claims, 27 Drawing Sheets

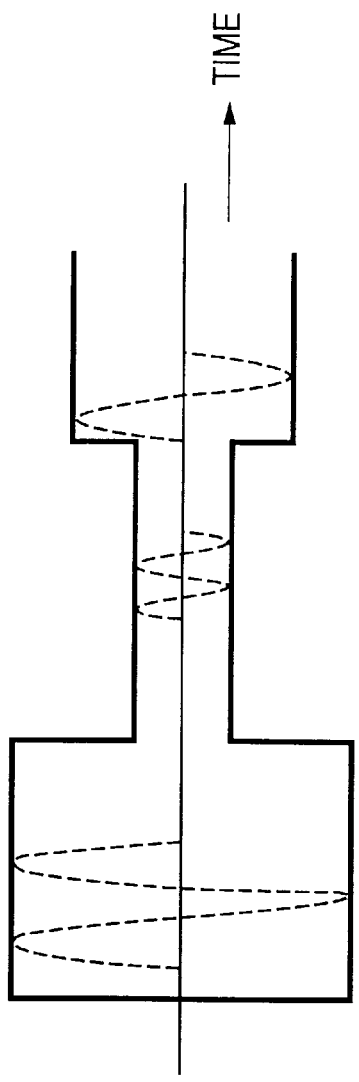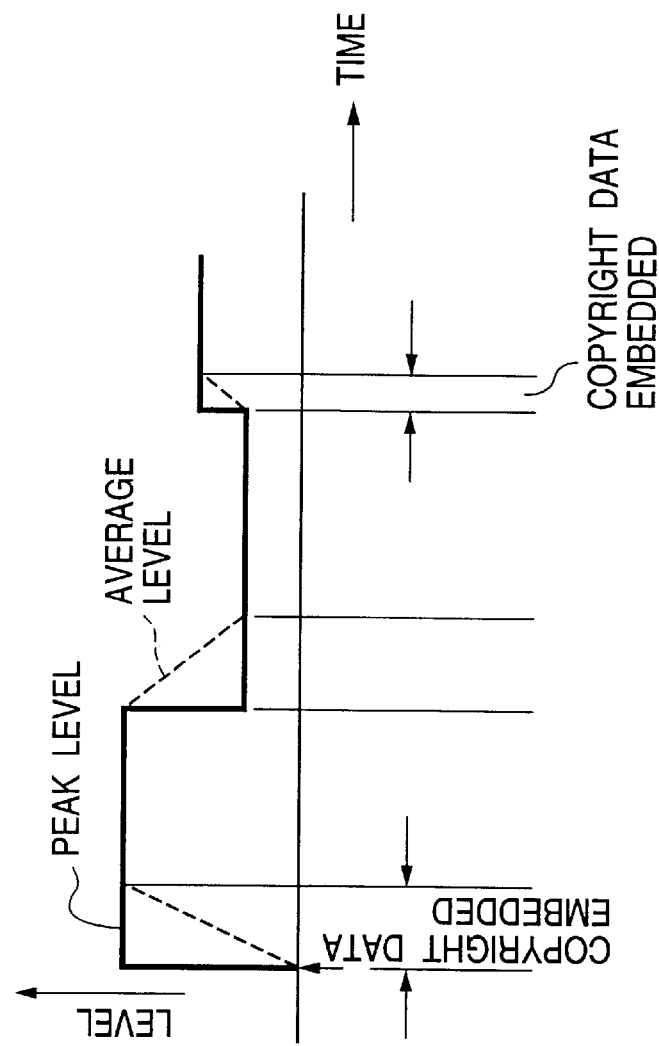
FIG. 6(a)
FIG. 6(b)

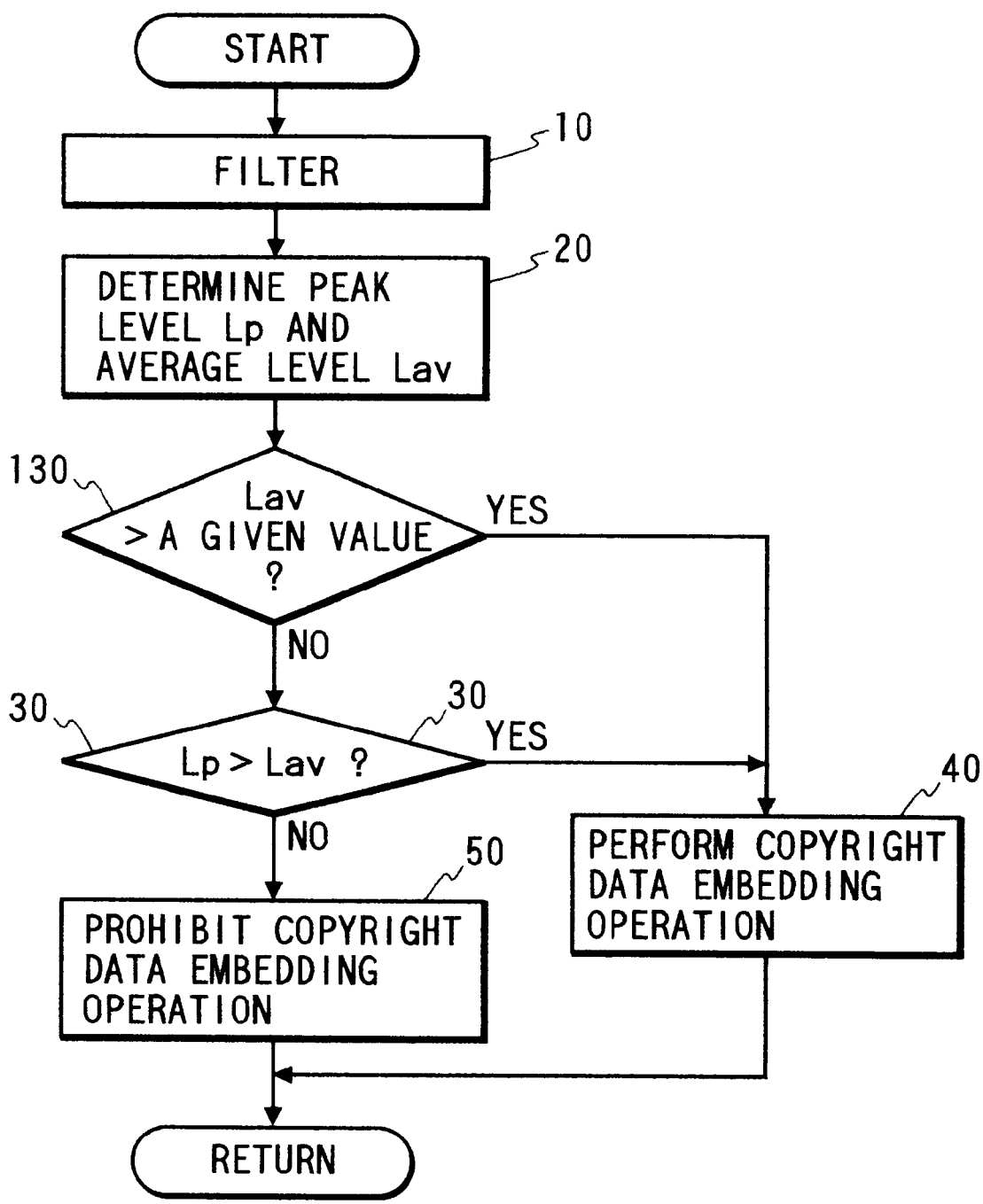

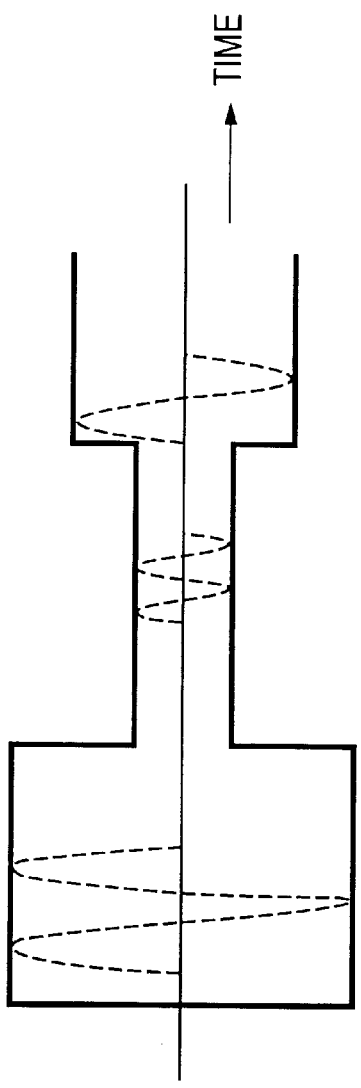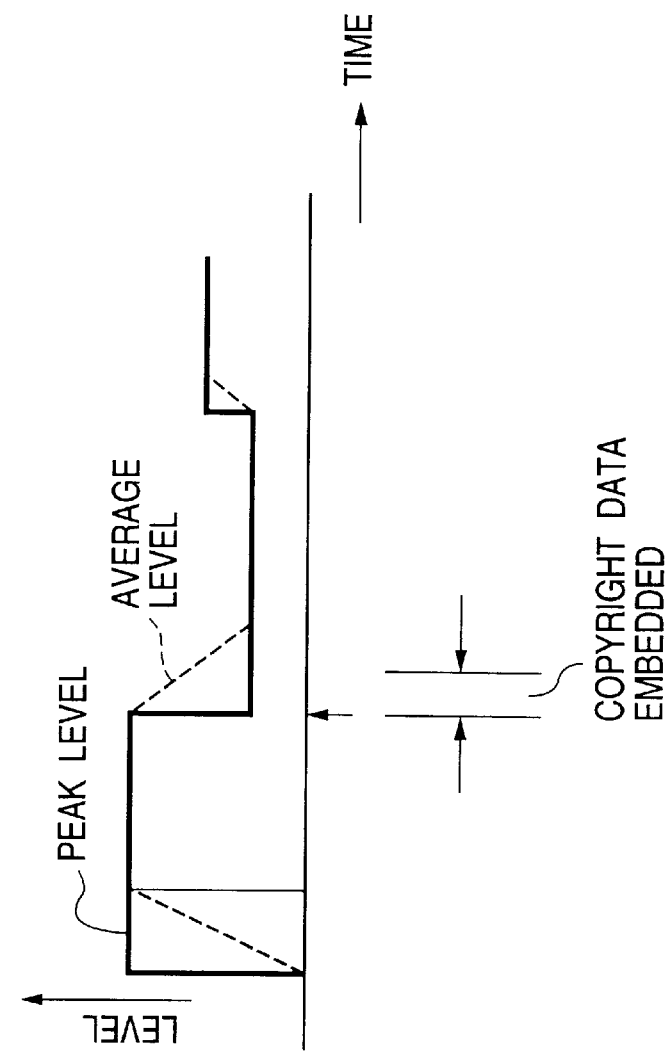
FIG. 14(a)
FIG. 14(b)

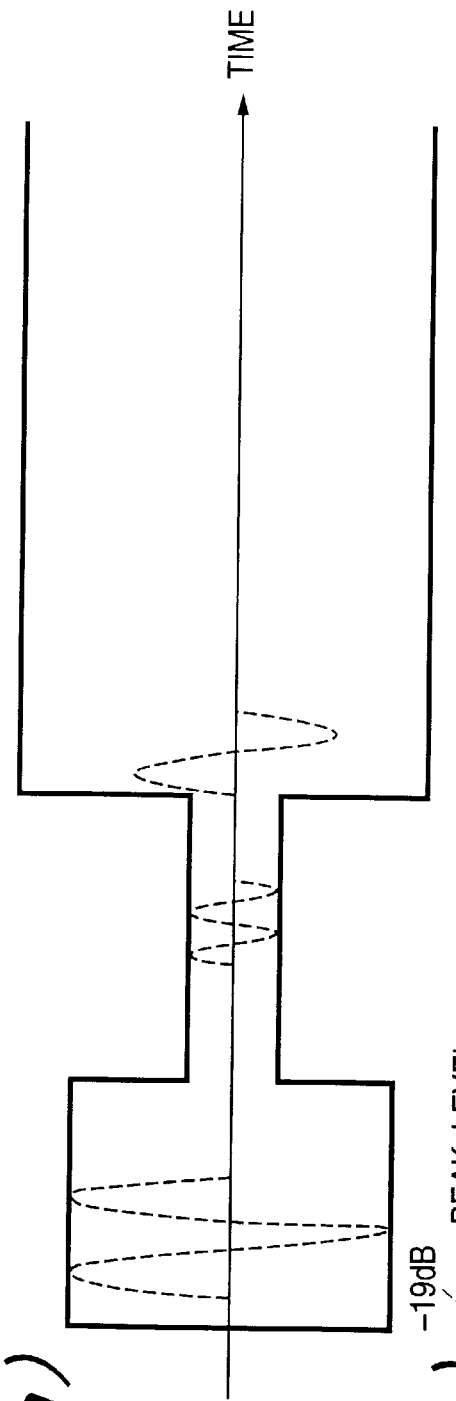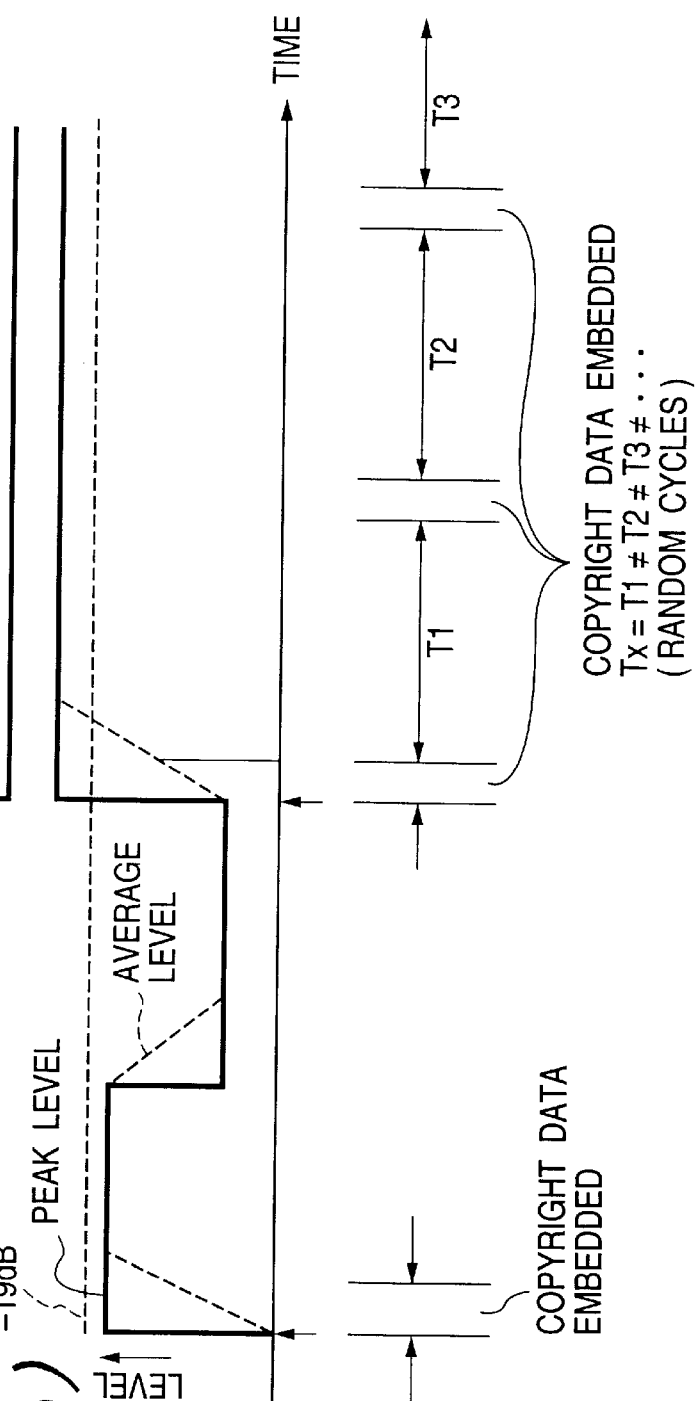
FIG. 24(a)
FIG. 24(b)

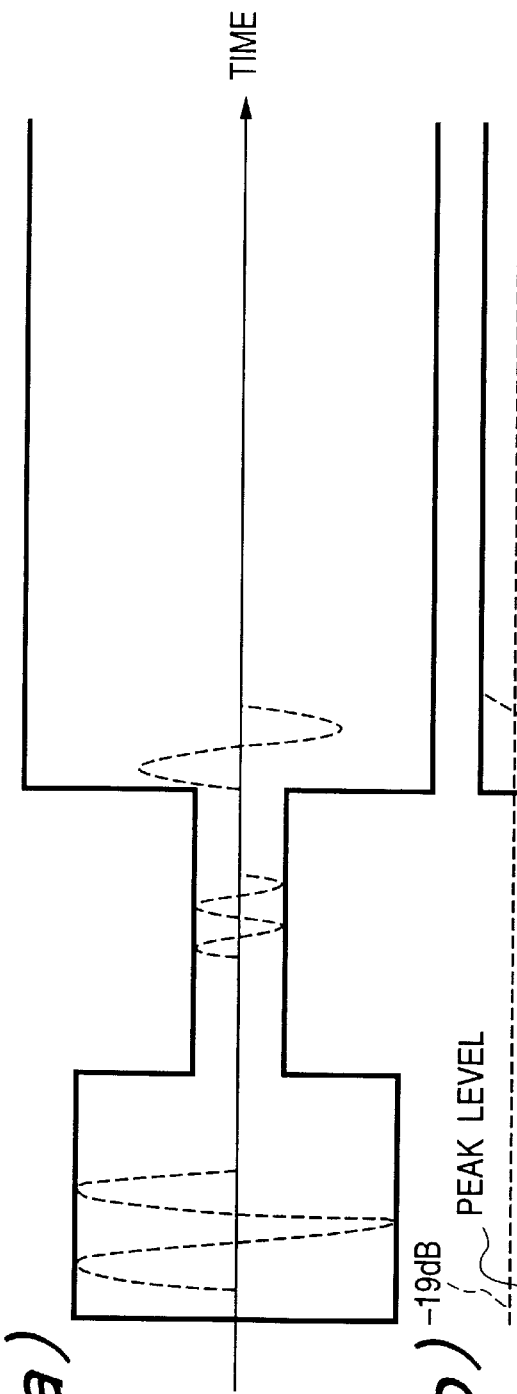
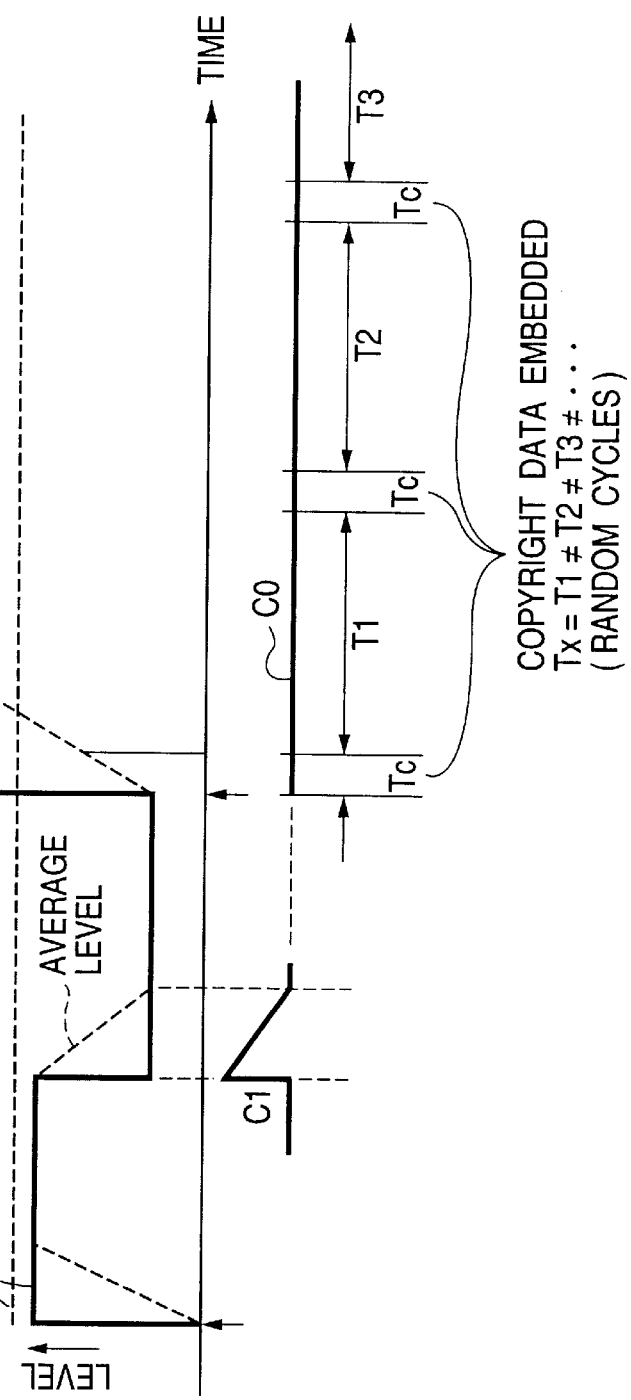
FIG. 35(a)
FIG. 35(b)

COPYRIGHT INFORMATION EMBEDDING APPARATUS

BACKGROUND OF THE INVENTION

1. Technical Field of the Invention

The present invention relates generally to a copyright information embedding apparatus designed to embedding information for managing copyright in a storage medium when recording analog signals such as audio signals in digital form, and a record carrier recording thereon that information.

2. Background of Related Art

Optically readable discs such as "Compact Discs" have come into wider use as audio record carriers than conventional magnetic tapes. An EFM recording format using 8-bit fixed length data symbols and a data format including a subcode, audio data, and a CRC are established as logical formats for CDs. CD players having a variety of application functions are being developed.

CDs are also used as CD-ROMs by discriminating control bits (four bits) in a subcode of a Q channel or detecting the absence of a TOC and have wide applicability to the field of electronic publication for mass storage and high-speed access. The CD-ROMs, however, have the drawback in that audio signals are compressed by ADPCM, which makes it impossible to reproduce the audio signals at original quality levels. A recording system designed to achieve the high fidelity is sought. In other words, development of optical discs capable of recording audio signals within a band of twice that of a conventional CD is expected.

Such high-quality hi-fi signals do not deteriorate in a duplication process as long as they are copied in digital form, which is quite convenient for users, but undesirable from the viewpoint of copyright protection. For avoiding such a problem, a system designed to limit the number of copies of digital information (U.S. Pat. No. 5,428,598), a system having no digital signal output terminals, a system designed to remove part of a band of an analog output signal, a system embedding copyright data into digital data (U.S. Pat. No. 5,319,735), and a system identifying an user who made a copy by detecting an identification signal formed by slightly changing original data, have been proposed.

The system embedding copyright data into digital data, however, has the drawback in that D/A conversion of the digital data into analog audio signals in a reproduction operation would cause reproduced sound quality to be deteriorated or changed uncomfortably.

SUMMARY OF THE INVENTION

It is therefore a principal object of the present invention to avoid the disadvantages of the prior art.

It is another object of the present invention to provide a copyright information embedding system designed to embed information for copyright protection into digital signals without deterioration of analog signals reproduced.

According to one aspect of the present invention, there is provided a copyright information embedding apparatus which comprises: (a) an A/D conversion means for converting an analog audio signal into a digital signal; (b) a modulation means for modulating a copyright data signal for the digital signal using spectrum spread; (c) a level detection means for detecting a variation in level of the digital signal; and (d) a copyright data embedding circuit embedding the copyright data signal into the digital signal when the variation in level of the digital signal detected by the level detection means shows a preselected variation.

According to another aspect of the invention, there is provided a record carrier which comprises: (a) a digital signal into which an analog audio signal is converted; and (b) a copyright data signal carrying copyright information about the digital signal, modulated with spectrum spread, the copyright data signal being embedded into the digital signal each time a variation in level of the digital signal shows a preselected variation.

According to the third aspect of the invention, there is provided a copyright information embedding apparatus which comprises: (a) an A/D conversion means for converting an analog audio signal into a digital signal; (b) a modulation means for modulating a copyright data signal carrying copyright information about the digital signal using spectrum spread; (c) a frequency detection means for detecting a frequency of the digital signal; and (d) a copyright data embedding circuit embedding the copyright data signal into the digital signal at a preselected power level different from that of the digital signal.

According to the fourth aspect of the invention, there is provided a record carrier which comprises: (a) a digital signal into which an analog audio signal is converted; and (b) a copyright data signal carrying copyright information about the digital signal, modulated with spectrum spread, the copyright data signal being embedded into the digital signal at a preselected power level different from that of the digital signal.

According to the fifth aspect of the present invention, there is provided a copyright information embedding method comprising the steps of: (a) A/D-converting an analog audio signal into a digital signal; (b) modulating a copyright data signal for the digital signal using spectrum spread; (c) detecting a variation in level of the digital signal; and (d) embedding the copyright data signal into the digital signal when the variation in level of the digital signal detected by the level detection means shows a preselected variation.

According to the sixth aspect of the present invention, there is provided a copyright information embedding method comprising the steps of: (a) A/D-converting an analog audio signal into a digital signal; (b) modulating a copyright data signal carrying copyright information about the digital signal using spectrum spread; (c) detecting a frequency of the digital signal; and (d) embedding the copyright data signal into the digital signal at a preselected power level different from that of the digital signal.

According to the seventh aspect of the present invention, there is provided a copyright information embedding apparatus which comprises: (a) an A/D conversion means for converting an analog audio signal into a digital signal; (b) a modulation means for modulating a copyright data signal for the digital signal using spectrum spread; (c) a level detection means for detecting a level of the digital signal; and (d) a copyright data embedding circuit embedding the copyright data signal into the digital signal when the level of the digital signal detected by the level detection means lies within a preselected range.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 6(a) shows a waveform of an original input signal;

FIG. 6(b) shows the relation among a peak level, an average level of a signal into which the original input signal in FIG. 6(a) is converted in digital form, and the time during which a copyright data signal is embedded;

FIG. 7 is a flowchart of a program of a copyright data embedding operation which is a modification of the one shown in FIG. 5;

FIG. 14(a) shows a waveform of an original input signal;

FIG. 14(b) shows the relation among a peak level, an average level of a signal into which the original input signal in FIG. 14(a) is converted in digital form, and the time during which a copyright data signal is embedded;

FIG. 24(a) shows a waveform of an original input signal;

FIG. 24(b) shows the relation among a peak level, an average level of a signal into which the original input signal in FIG. 24(a) is converted in digital form, and the time during which a copyright data signal is embedded;

FIG. 35(a) shows a waveform of an original input signal; and

FIG. 35(b) shows the relation between a peak level and an average level of a signal in FIG. 31.

DESCRIPTION OF THE PREFERRED EMBODIMENT

Figure 1:
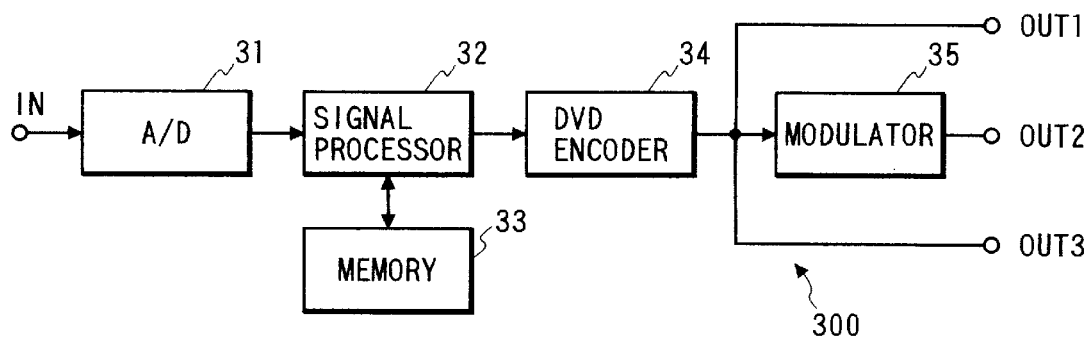
FIG. 1 is a block diagram which shows a copyright information embedding apparatus according to the present invention.

Referring now to the drawings, particularly to FIG. 1, there is shown a copyright information embedding apparatus (encoder) 300 according to the present invention.

The copyright information embedding apparatus 300 includes generally an A/D converter 31, a signal processing circuit 32, a memory 33, a DVD encoding circuit 34, and a modulation circuit 35. When an analog signal such as an audio signal is inputted to an input terminal IN, it is sampled by the A/D converter 31 at a high sampling frequency (i.e., sampling periods At in FIG. 3), for example, 192 kHz enough to prohibit digital copying without authorization and converted into, for example, a data stream of 24-bit high-resolution PCM signals, as shown below, along a curve α in FIG. 3.

xb1, x1, xa1, x2, xb2, x3, xa2, . . . xbi, x2i-1, xai, x2i . . .

The above data stream is encoded by the signal processing circuit 32 and the memory 33 and packed by the DVD encoding circuit 34, which is, in turn, outputted directly from an output terminal OUT1 or modulated by the modulation circuit 35 according to a type of record carrier and outputted from an output terminal Q2. From an output terminal Q3, copyright data is outputted as needed.

Figure 2:
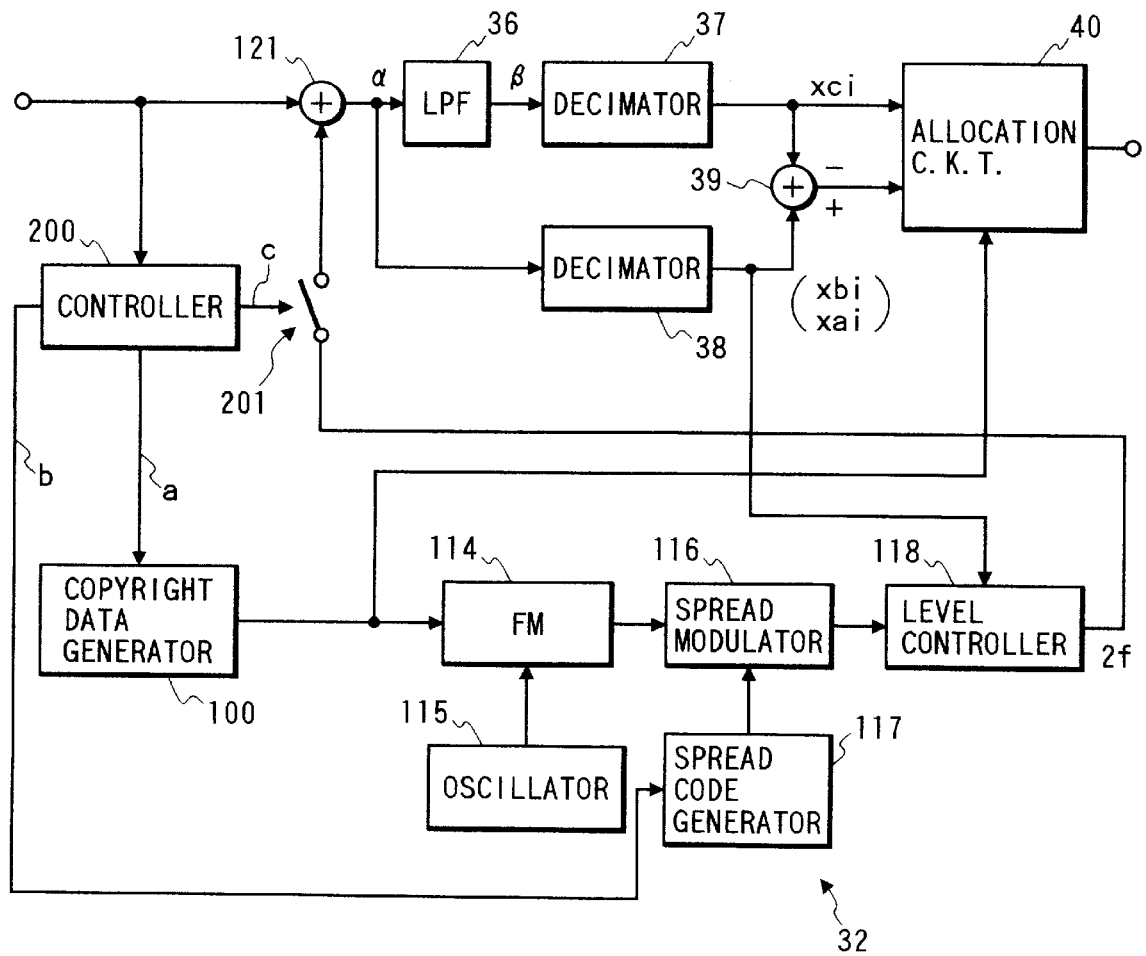
FIG. 2 is a block diagram which shows a circuit structure of a signal processing circuit of the copyright information embedding apparatus in FIG. 1.

FIG. 2 shows a circuit structure of the signal processing circuit 32.

Figure 3:
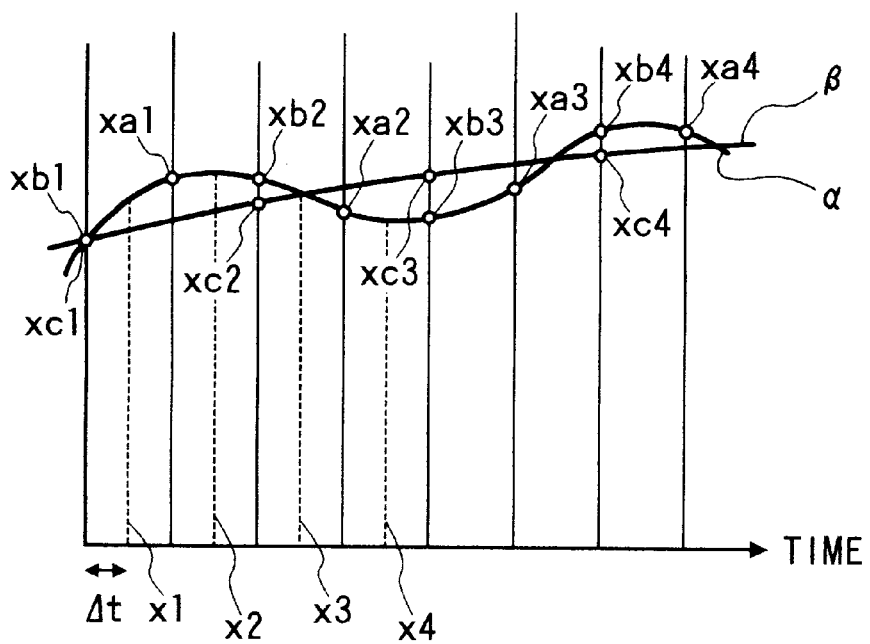
FIG. 3 is a graph which shows a data stream sampled by an A/D converter.

An output signal from the A/D converter 31 is inputted to an adder circuit 121. The adder circuit 121 adds copyright data, as will be discussed later in detail, to the input signal and outputs it to a low-pass filter (LPF) 36. The LPF 36 includes, for example, a FIR filter allowing signals having frequencies within a ½ band to pass therethrough and selects a data stream of xc1, *, *, *, xc2, *, *, *, xc3, *, *, *, xci, *, *, *, . . . along a curve β, as shown in FIG. 3, from the data stream of xbi, x2i-1, xai, x2i along the curve α.

A decimating circuit 37 removes data samples * from the data stream outputted from the LPF 36 to produce a data stream of xc1, xc2, xc3, . . . , xci, . . . . Similarly a decimating circuit 38 removes data samples xi from the data stream outputted from the LPF 36 to produce a data stream of xb1, xa1, xb2, xa2, . . . , xbi, xai, . . . .

A difference calculating circuit 39 which includes an adder determines differences Δ1i (=xib−xci) and Δ2i (=xai−xci) based on the data streams outputted from the decimating circuits 37 and 38. The difference data Δ1i and Δ2i each consist of 24 or less bits. The number of bits may be either fixed or changed.

Figure 4:
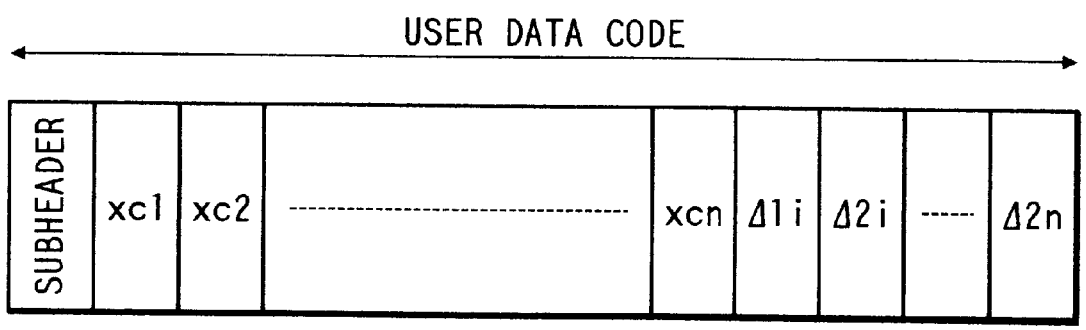
FIG. 4 shows a user data code provided by an allocation circuit of the signal processing circuit in FIG. 2.
Figure 33:
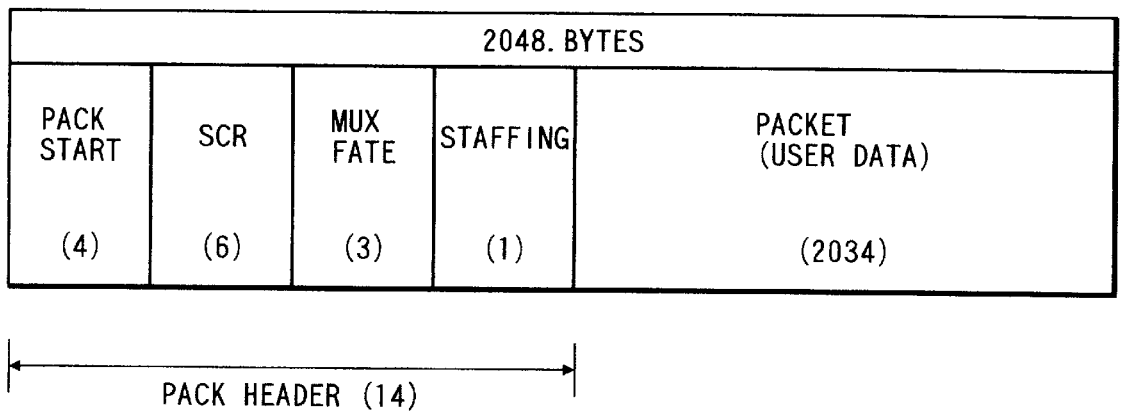
FIG. 33 illustrates a packet structure of a DVD (Digital Video Disc)

An allocation circuit 40 packs the data stream xci from the decimating circuit 37, the difference data Δ1i and Δ2i, and copyright data together to produce user data codes (one is shown in FIG. 4) which are, in turn, recorded on a DVD (digital video disc) or outputted to a transmission path, for example. When recorded in the DVD, each user data code consists of 2034 bytes as shown in FIG. 33, the number of pieces of each of the data xci, the difference data Δ1i and Δ2i are 225, and each data consists of 3 bytes, and a subheader consists of a 9 bytes. The data stream of xci corresponds to a data stream sampled at a sampling frequency of one-fourth that in the A/D converter.

Embedding of copyright data will be discussed below.

A copyright data generator 100 produces copyright data on an audio signal inputted to the input terminal IN which comprises, for example, a copyright serial number ISRC (International Standard Recording Code, 16 bytes or less) for copyright management, a cutting player identification code (4 types or less) which is used as a SID (Source Identification) code, a recording date (3 bytes), a number of a recording (3 bytes), the number of copies (4 bytes), and the number of times allowing a copy to be made (3 bytes) and supplies it both to an FM modulator 114 and the allocation circuit 40.

The allocation circuit 40 divides the copyright data into several pieces and adds them to some of the subheaders of the user data codes, as shown in FIG. 4. In case of a DVD, the copyright data is also recorded in a copyright management information (CMI) area formed on an inner peripheral section of the DVD which corresponds to a TOC area provided on a CDR disc, for example. The CMI area is defined within a partial RAM or a PCA (post cutting area), BCA (burst cutting area).

The FM modulator 114 modulates the copyright data at a frequency of, for example, 5 kHz outputted from an oscillator 115 and supplies it to a spread modulator 116. The spread modulator 116 spreads the frequency spectrum of the copyright data modulated by the FM modulator 114 using a spread code generated by a spread code generator 117 so that it cannot be perceived acoustically even if D/A converted. A level control circuit 118 controls the level of an output from the spread modulator 116 according to the level of the data stream (xbi, xa1) outputted from the decimating circuit 38. For example, when the frequency of an original audio signal is 2 kHz, the level control circuit 118 decreases the level of the output from the spread modulator 116 by −25 dB. When it is 10 kHz, the level of the output from the spread modulator 116 is decreased by −19 dB. Specifically, the level control circuit 118 decreases the level of the output from the spread modulator 116 below a CMR (Code to Music Ratio) in a psychoacoustic model so that the copyright data cannot be perceived acoustically by a listener and provides a level-controlled signal to the adder 121 through a switch 201 to embed it into the output signal from the A/D converter 31.

The control circuit 200 provides control signals a, b, and c to the copyright data generator 100, the spread code generator 117, and the switch 201 in a copyright data embedding operation.

Figure 5:
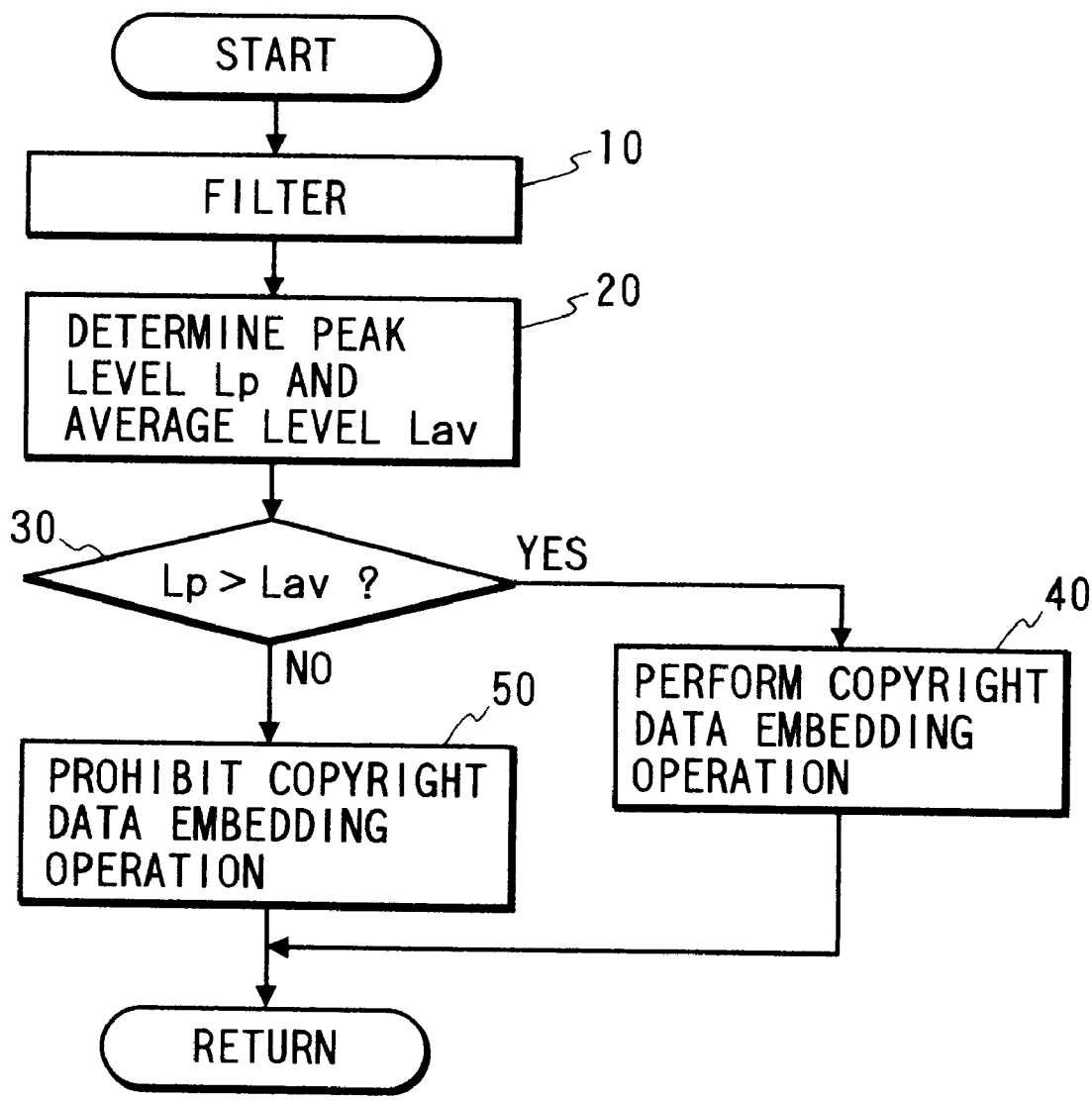
FIG. 5 is a flowchart of a program of a copyright data embedding operation performed by a control circuit of the signal processing circuit shown in FIG. 2 according to the first embodiment of the invention.

FIG. 5 shows a program or sequence of logical steps of the copyright data embedding operation performed by the control circuit 200.

After entering the program, the routine proceeds to step 10 wherein an output signal from the A/D converter 31 is filtered using a weighting filter to decrease the level thereof in a high and middle (high-mid) frequency band for modifying the audibility. The routine proceeds to step 20 wherein an average level Lav (a corrected value) and a peak level Lp of the filtered signal outputted from the A/D converter 31 are determined. For example, the average level Lav is determined by sampling the signal outputted from the A/D converter 31 over 300 msec. so that it may, as shown in FIG. 6(b), coincide with the peak level Lp when a given number of consecutive constant amplitudes of an original signal, as shown in FIG. 6(a), appear.

The routine proceeds to step 30 wherein it is determined whether the peak level Lp is greater than the average level Lav or not. If a YES answer is obtained (Lp>Lav), then the routine proceeds to step 40 wherein the control circuit 200 provides the control signals a, b, and c of an ON-level to the copyright data generator 100, the spread code generator 117, and the switch 201 to start the copyright data embedding operation. Specifically, the copyright data generator 100 produces the copyright data to the allocation circuit 40 and the FM modulator 114. The spread modulator 116 modulates the output from the FM modulator 114 in response to the control signal b inputted to the spread code generator 117. The switch 201 is turned on to embed the copyright data level-controlled by the level control circuit 118 into the output from the A/D converter 31 through the adder 121.

Alternatively, if a NO answer is obtained in step 30, then the routine proceeds to step 50 wherein the control circuit 200 provides the control signals a, b, and c of an OFF-level to the copyright data generator 100, the spread code generator 117, and the switch 201 to prohibit the copyright data embedding operation. Specifically, the copyright data generator 100 holds the copyright data from being outputted to the allocation circuit 40 and the FM modulator 114. The spread modulator 116 is deactivated. The switch 201 is turned off to block the communication between the adder 121 and the level control circuit 118. If the control signals a, b, and c of the OFF-level are provided before one of data codes constituting the copyright data is recorded completely, the copyright data embedding operation is deactivated after completion of recording of that data code.

FIG. 7 shows a program of the copyright data embedding operation performed by the control circuit 200 which is a modification of the one shown in FIG. 5. The same reference numbers as employed in FIG. 5 refer to the same steps, and explanation thereof in detail will be omitted here.

After step 20, the routine proceeds to step 130 wherein it is determined whether the average level Lav is greater than a value of a full peak minus 19 dB or not. The full peak is an upper limit at which a signal is allowed to be recorded. If a YES answer is obtained, then the routine proceeds to step 40 wherein the control circuit 200 provides the control signals a, b, and c of the ON-level to the copyright data generator 100, the spread code generator 117, and the switch 201 to start the copyright data embedding operation. Alternatively, if a NO answer is obtained in step 130, then the routine proceeds to step 30 wherein it is determined whether the peak level Lp is greater than the average level Lav or not. If a NO answer is obtained, then the routine proceeds to step 50 wherein the control circuit 200 provides the control signals a, b, and c of an OFF-level to the copyright data generator 100, the spread code generator 117, and the switch 201 to prohibit the copyright data embedding operation.

Figure 8:
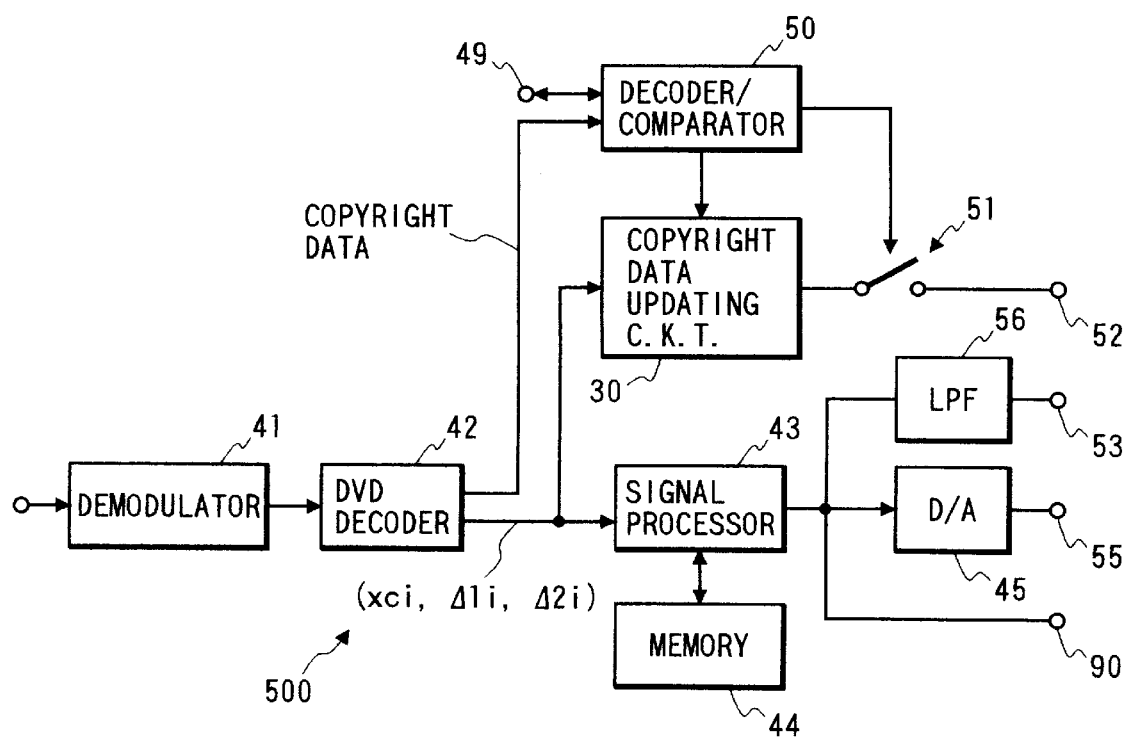
FIG. 8 is a block diagram which shows a decoder of the invention.

FIG. 8 shows a circuit structure of a decoder 500 according to the present invention.

The decoder 500 includes a demodulator 41, a DVD decoding circuit 42, a signal processing circuit 43, a memory 44, a decoder/comparator 50, a copyright data updating circuit 30, a low-pass filter 53, and a D/A converter 56.

When a signal coded by the copyright information embedding apparatus 300 is inputted to the demodulator 41, the demodulator 41 demodulates the input signal according to a modulation format of the modulating circuit 35 of the copyright information embedding apparatus 300 and outputs it to the DVD decoding circuit 42. The DVD decoding circuit 42 decodes the input signal and provides decoded signals each consisting of the data stream of xci into which the copyright data is embedded and the difference data $\Delta 1i$ and $\Delta 2i$ to the signal processing circuit 43 and the copyright data updating circuit 30. The DVD decoding circuit 42 also provides the copyright data which is unpacked from the subheaders of the user data codes or reproduced from the CMI area of the DVD to the decoder/comparator 50.

Figure 9:
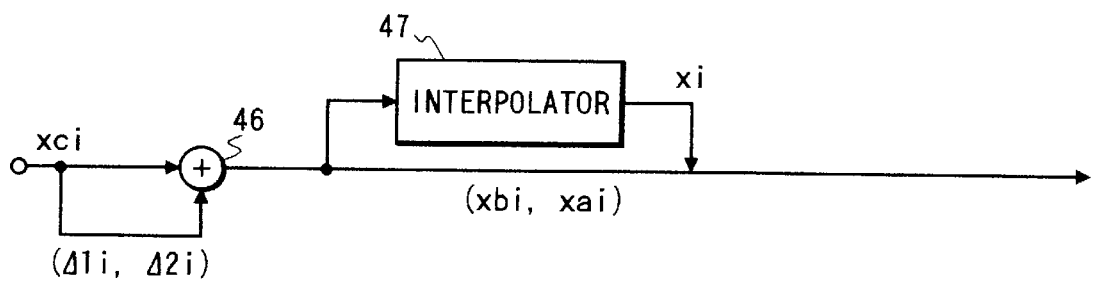
FIG. 9 is a circuit diagram which shows a signal processing circuit of the decoder in FIG. 8.

The signal processing circuit 43 includes, as shown in FIG. 9, an adder 46 and an interpolator 47. The adder 46 receives the decoded signal outputted from the DVD decoding circuit 42 and performs addition operations, as shown below, to restore the data stream of xbi and xai each consisting of 24 bits similar to the original data stream.

$\Delta 1i + xci = xbi$ $\Delta 2i + xci = xai$

Figure 10:
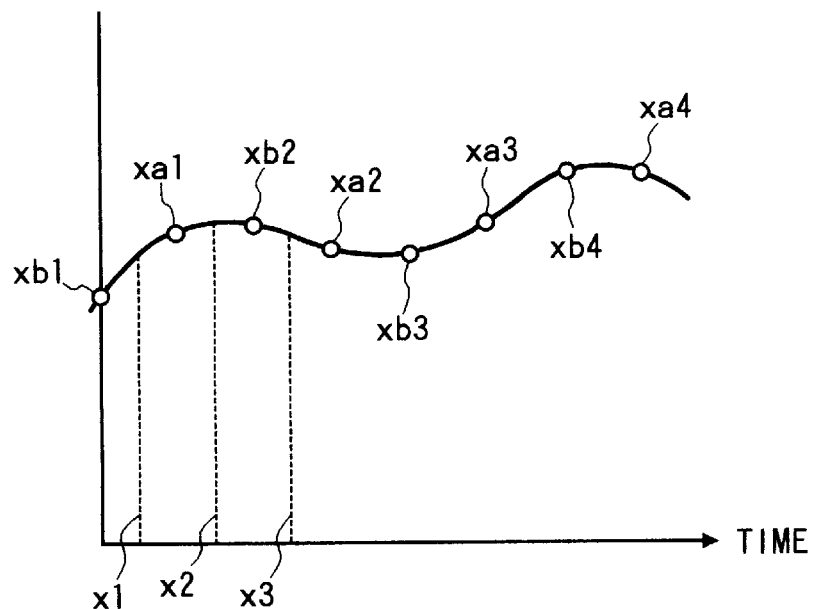
FIG. 10 is a graph which shows a data stream interpolated by an interpolator in FIG. 9.

The interpolator 47 finds or interpolates data xi, as shown in FIG. 10, intermediate between the data xai and xbi. The interpolation of the data xi may be achieved by setting the data xi to zero (0) using the so-called up sampling technique and passing them through a low-pass filter. The data xi may alternatively be found with curve approximation or predictive approximation. In case of the predicative approximation, a measure of approximation may be improved by adding approximated subdata to the difference data $\Delta 1i$ and $\Delta 2i$.

The data xai, xbi, and xi are arranged as follows:
xbi, x1, xa1, x2, xb2, x3, xa2, . . . xbi, x2i-1, xa1, x2i, . . .

The above data stream is supplied from the signal processing circuit 43 to the D/A converter 55, the LPF 56, and a digital output terminal 90.

The D/A converter 45 converts the data stream of xbi, x2i-1, xai, and x2i, which are A/D converted by the encoder (i.e., the copyright information embedding apparatus 300) with 24 quantization bits and into which the copyright data is embedded, into an analog signal at a sampling frequency of 192 kHz and outputs it through an analog output terminal 55. The LPF 56 passes the input signal from the signal processing circuit 43 within a frequency band (e.g., 48 kHz) of one-fourth that of the input signal and outputs it through an output terminal 53. The data stream of xbi, x2i-1, xai, and x2i outputted from the signal processing circuit 43 is also outputted directly from a digital output terminal 90.

Figure 12:
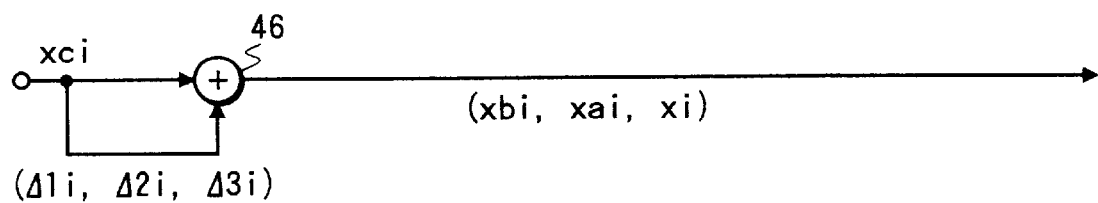
FIG. 12 is a circuit diagram which shows a signal processing circuit which is a modification of the one in FIG. 9.
Figure 11:
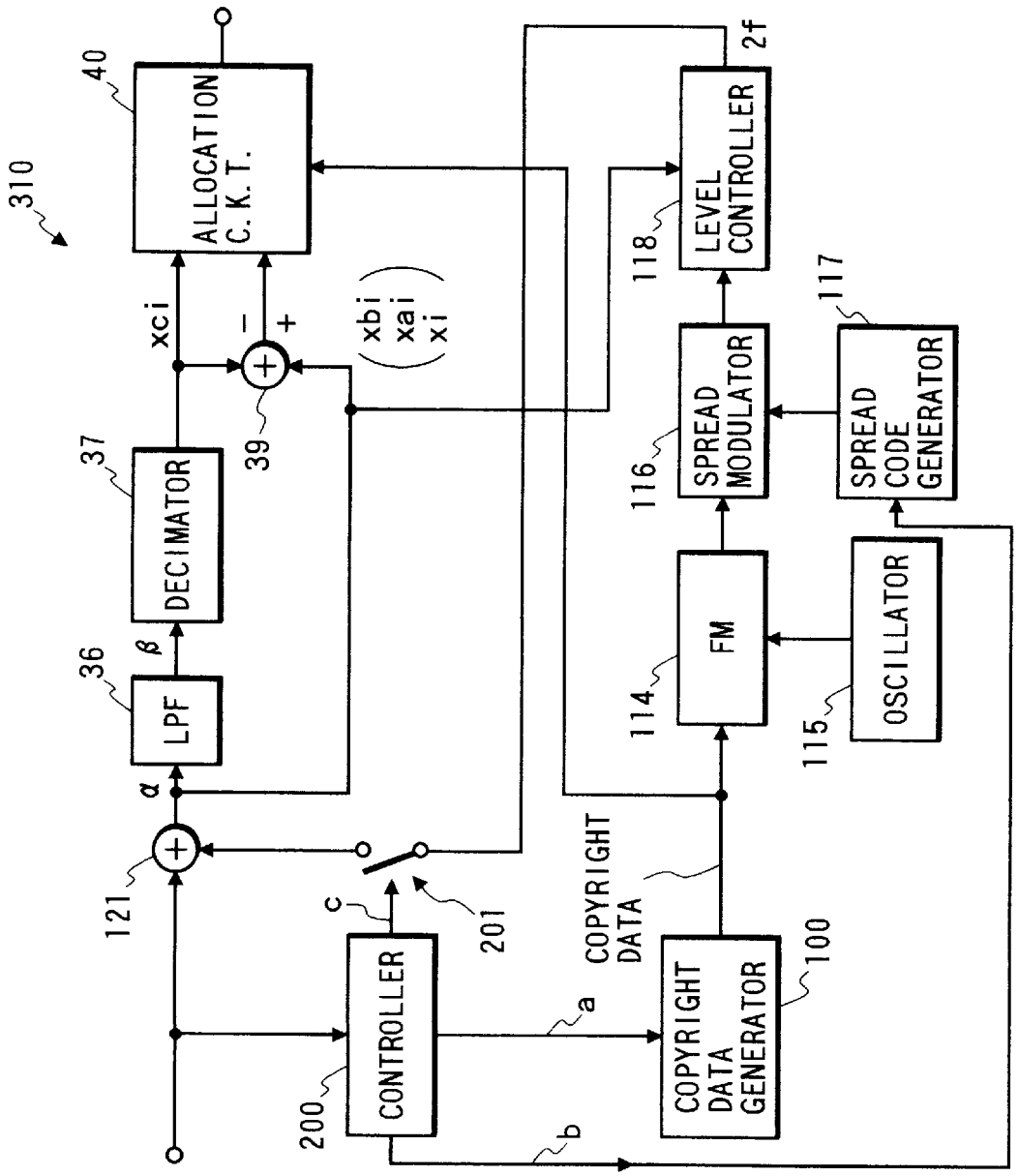
FIG. 11 is a block diagram which shows a signal processing circuit which is a modification of the one shown in FIG. 2.

FIGS. 11 and 12 show modifications of the encoder (i.e., the copyright information embedding apparatus 300) shown in FIGS. 1 and 2 and the decoder shown in FIGS. 8 and 9, respectively. The same reference numbers as employed in the above embodiments refer to the same parts, and explanation thereof in detail will be omitted here.

The encoder 310, as can be seen from the drawing, does not have the decimating circuit 38 which removes the data xi from the input signal. Specifically, the difference calculating circuit 39 determines difference data $\Delta 1i$, $\Delta 2i$, and $\Delta 3i$, as shown below.

$xbi - xci = \Delta 1i$ $xai - xci = \Delta 2i$ $xi - xci = \Delta 3i$

The allocation circuit 40 packs the data stream of xci, $\Delta 1i$, $\Delta 2i$, and $\Delta 3i$ and the copyright data together and outputs it. The copyright data is, similar to the first embodiment, embedded into the data stream of xci, $\Delta 1i$, $\Delta 2i$, and $\Delta 3i$ intermittently.

The decoder, as clearly shown in FIG. 12, does not have the interpolator 47 in FIG. 9 because the encoder 310 does not remove or decimate the data xi. Specifically, the adder 46 performs addition operations below to restore the original data stream of xbi, x2i-1, xai, and x2i. The other arrangements are identical with those shown in FIG. 8, and explanation thereof will be omitted here.

$xci + \Delta 1i = xbi$ $xci + \Delta 2i = xai$ $xci + \Delta 3i = xi$

Figure 13:
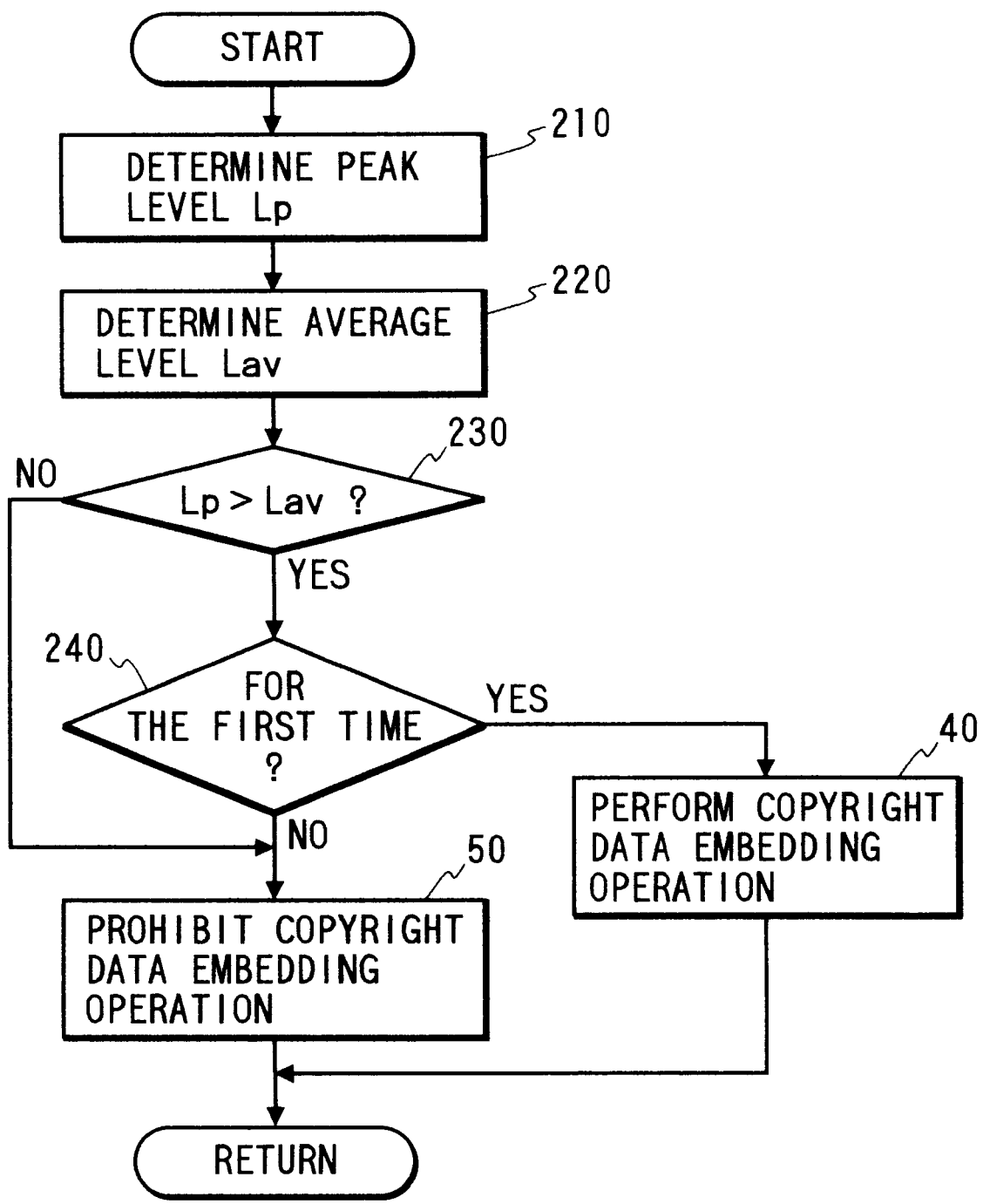
FIG. 13 is a flowchart of a program of a copyright data embedding operation according to the second embodiment of the invention.

FIG. 13 show a program of the copyright data embedding operation according to the second embodiment of the invention.

After entering the program, the routine proceeds to step 210 wherein the control circuit 200 sets a rising time constant and a falling time constant to, for example, 1 msec. and 150 msec., respectively, to determine a peal level Lp of an output from the A/D converter 31. The routine proceeds to step 220 wherein an average level Lav is determined in the same manner as discussed above in FIG. 5. The routine proceeds to step 230 wherein it is determined whether the peak level Lp is smaller than the average level Lav or not. If a NO answer is obtained, then the routine proceeds directly to step 50 to prohibit the copyright data embedding operation. Alternatively, if a YES answer is obtained in step 230, then the routine proceeds to step 240 wherein it is determined whether or not the YES answer in step 230 has been obtained in the first program cycle following a program cycle wherein the NO answer was obtained in step 230. If a YES answer is obtained, then the routine proceeds to step 40 wherein the control circuit 200 provides the control signals a, b, and c of the ON-level to the copyright data generator 100, the spread code generator 117, and the switch 201 to start the copyright data embedding operation.

Specifically, the copyright data is embedded into the output from the A/D converter 31 for a period of time during which one program cycle is completed immediately after the peak level Lp drops, as shown in FIG. 14(b). It is known in the art that a signal which is embedded into an audio signal changing in level, as shown in FIG. 14(a), when the audio signal drops in level rapidly, is difficult to perceive acoustically.

Figure 15:
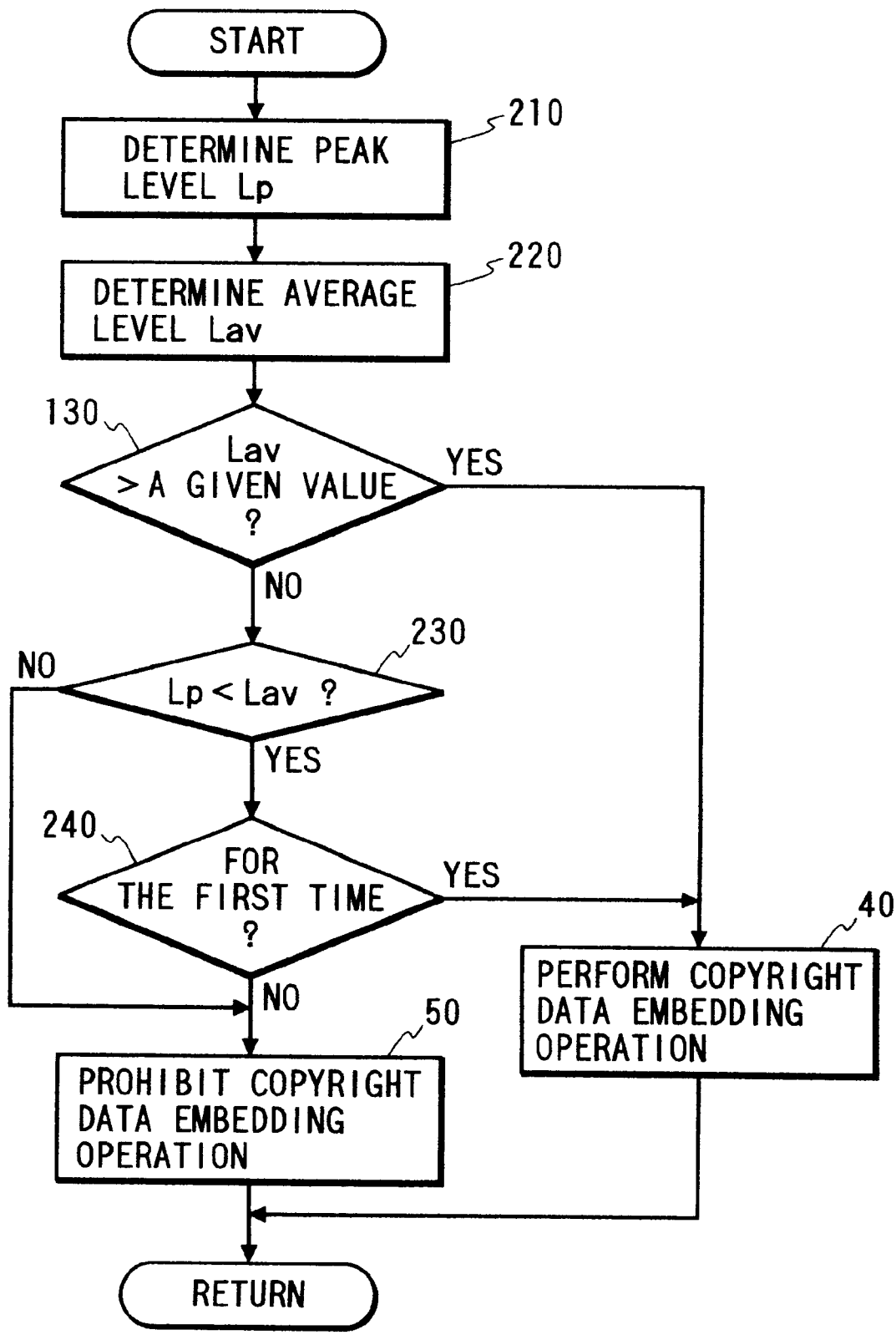
FIG. 15 is a flowchart of a program of a copyright data embedding operation according to the third embodiment of the invention.

FIG. 15 shows a program of the copyright data embedding operation according to the third embodiment which is a combination of the ones shown in FIGS. 7 and 13. The same step numbers as employed in FIGS. 7 and 13 refer to the same steps.

In steps 210 and 220, the average level Lav and the peak level Lp of an output signal from the A/D converter 31 are determined.

The routine proceeds to step 130 wherein it is determined whether the average level Lav is greater than a value of a full peak minus 19 dB or not. If a YES answer is obtained, then the routine proceeds to step 40 wherein the control circuit 200 provides the control signals a, b, and c of the ON-level to the copyright data generator 100, the spread code generator 117, and the switch 201 to start the copyright data embedding operation. Alternatively, if a NO answer is obtained in step 130, then the routine proceeds to step 230 wherein it is determined whether the peak level Lp is smaller than the average level Lav or not. If a NO answer is obtained, then the routine proceeds to step 50 wherein the control circuit 200 provides the control signals a, b, and c of an OFF-level to the copyright data generator 100, the spread code generator 117, and the switch 201 to prohibit the copyright data embedding operation. Alternatively, if a YES answer is obtained, then the routine proceeds to step 240 wherein it is determined whether the YES answer in step 230 has been obtained in the first program cycle following a program cycle wherein the NO answer was obtained in step 230 or not. If a YES answer is obtained, then the routine proceeds to step 40. Alternatively, if a NO answer is obtained, then the routine proceeds to step 50 wherein the control circuit 200 provides the control signals a, b, and c of an OFF-level to the copyright data generator 100, the spread code generator 117, and the switch 201 to prohibit the copyright data embedding operation.

Figure 16:
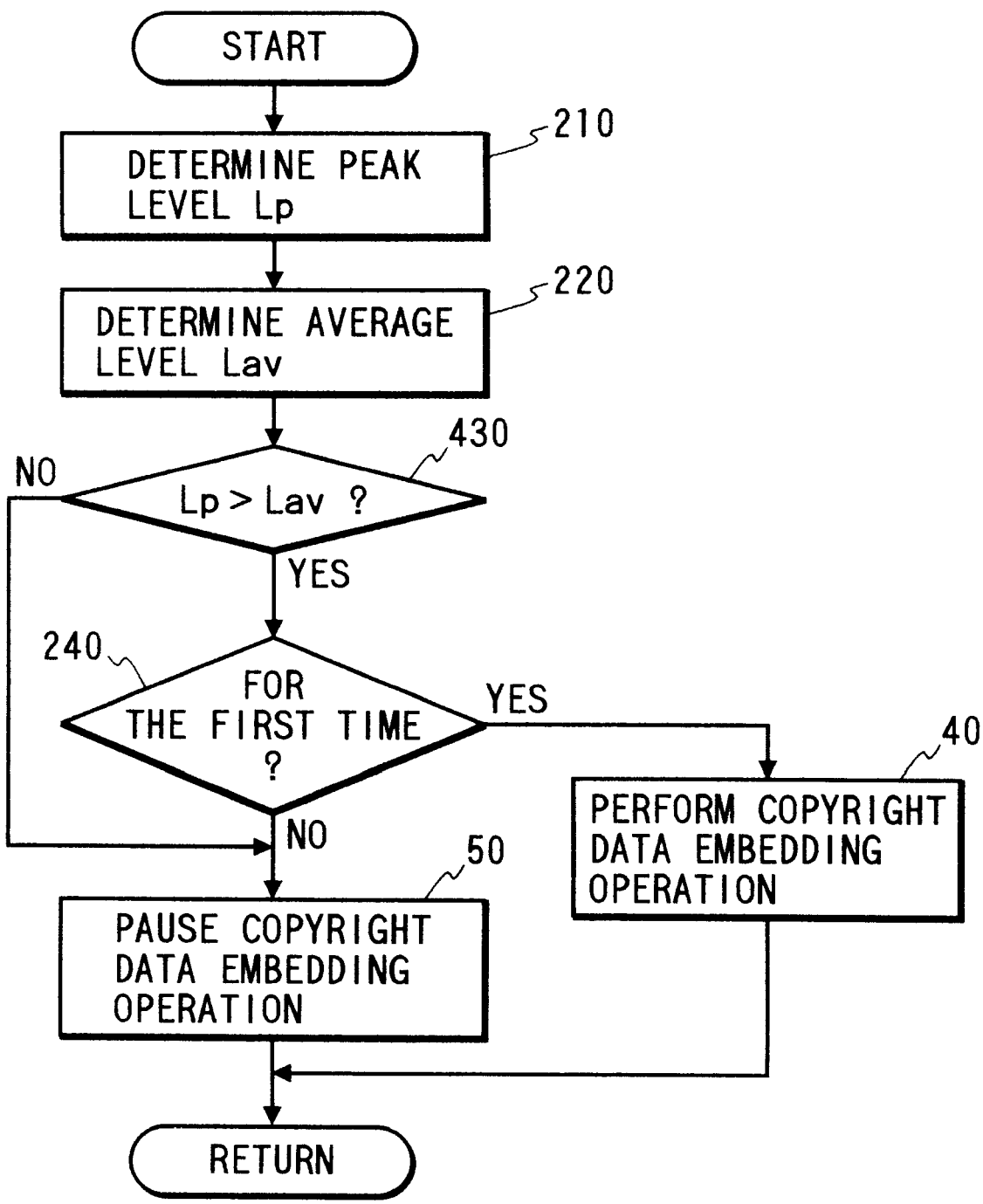
FIG. 16 is a flowchart of a program of a copyright data embedding operation according to the fourth embodiment of the invention.

FIG. 16 shows a program of the copyright data embedding operation according to the fourth embodiment which is a modification of the one shown in FIG. 13. The same step numbers as employed in the second embodiment in FIG. 13 refer to the same steps.

After step 220, the routine proceeds to step 430 wherein it is determined whether the peak level Lp is greater than the average level Lav or not. If a NO answer is obtained, then the routine proceeds to step 50 wherein the control circuit 200 provides the control signals a, b, and c of the OFF-level to the copyright data generator 100, the spread code generator 117, and the switch 201 to prohibit the next copyright data embedding operation. Alternatively, if a YES answer is obtained, then the routine proceeds to step 240 wherein it is determined whether the YES answer in step 430 has been obtained in the first program cycle following a program cycle wherein the NO answer was obtained in step 430 or not. If a YES answer is obtained, then the routine proceeds to step 40 wherein the control circuit 200 provides the control signals a, b, and c of the ON-level to the copyright data generator 100, the spread code generator 117, and the switch 201 to start the copyright data embedding operation. Alternatively, if a NO answer is obtained in step 240, then the routine proceeds to step 50.

Figure 17A:
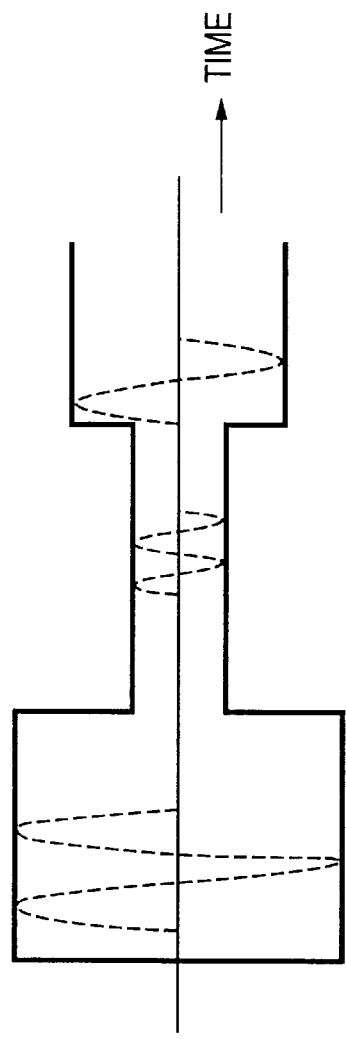
FIG. 17(a) shows a waveform of an original input signal.
Figure 17B:
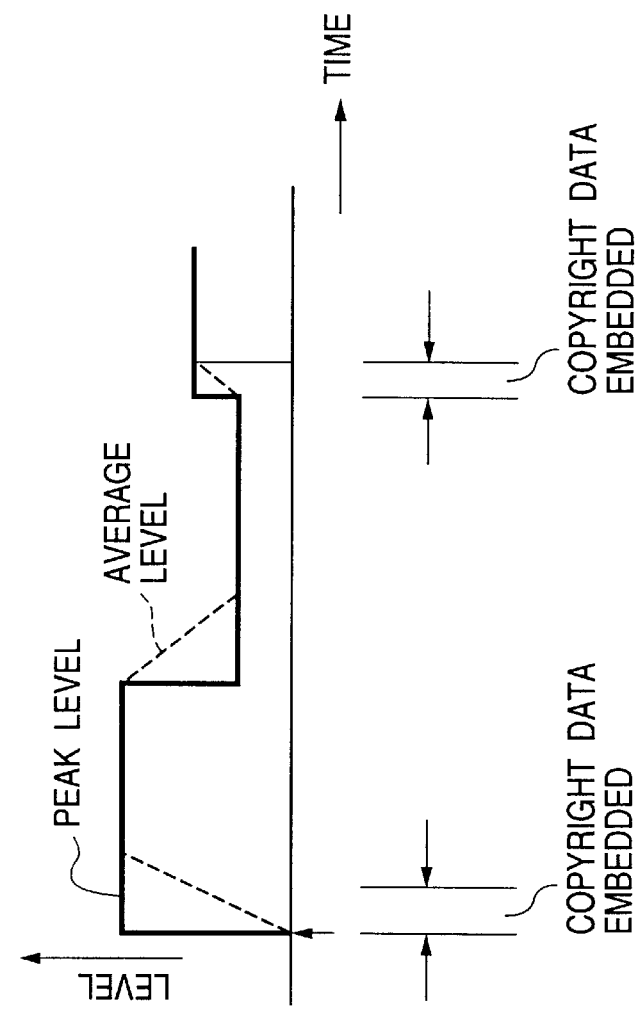
FIG. 17(b) shows the relation among a peak level, an average level of a signal into which the original input signal in FIG. 17(a) is converted in digital form, and the time during which a copyright data signal is embedded.

Specifically, the copyright data is, as can be seen from FIGS. 17(a) and 17(b), embedded into an output signal from the A/D converter 31 for each period of time during which the level of the output from the A/D converter 31 rises. It is understood that the copyright data will not be perceived acoustically when it is embedded into a sound signal at a time when the level of the signal is, as shown in FIG. 17(b), changed greatly.

Figure 18:
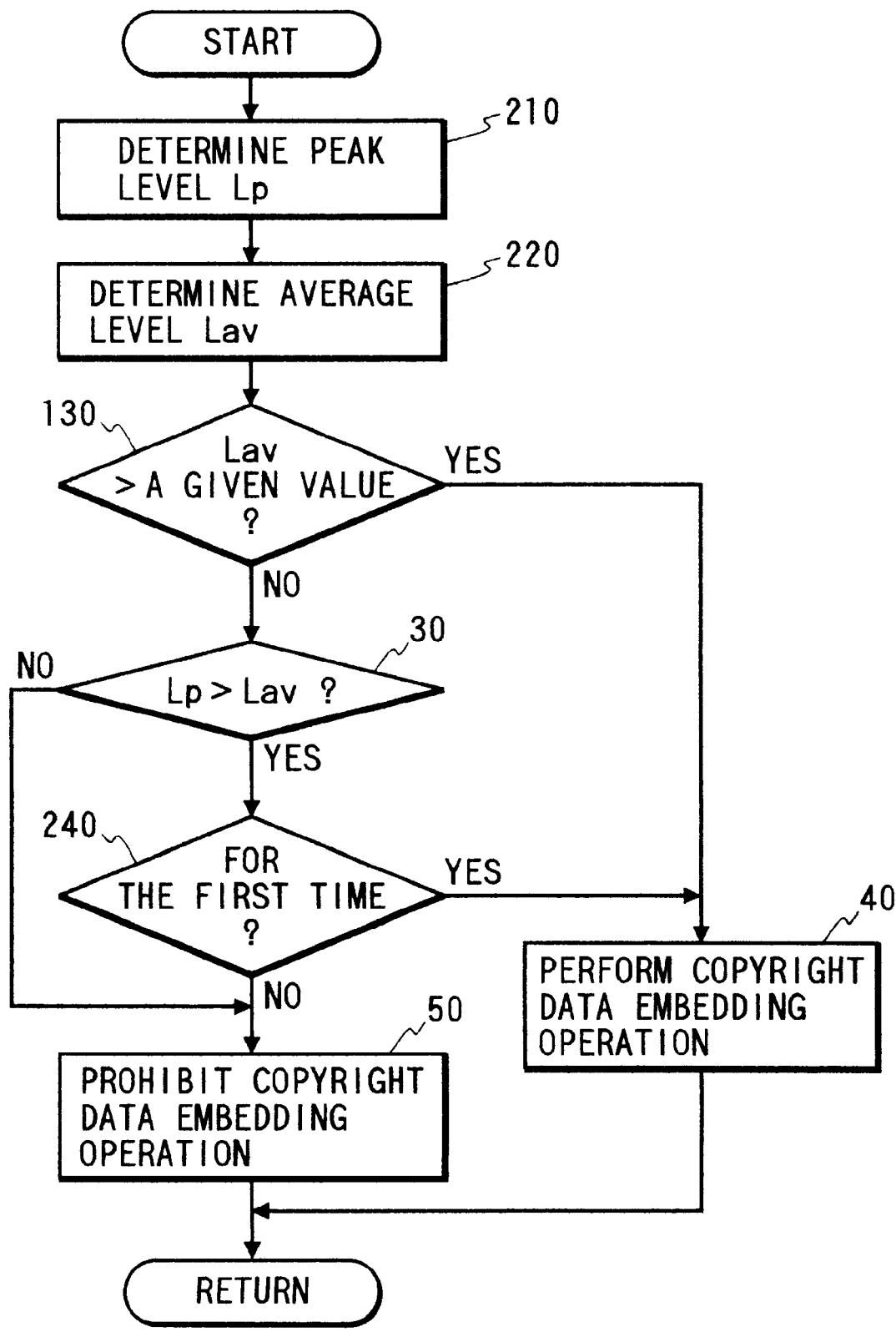
FIG. 18 is a flowchart of a program of a copyright data embedding operation according to the fifth embodiment of the invention.

FIG. 18 shows a program of the copyright data embedding operation according to the fifth embodiment which is a combination of the ones shown in FIGS. 7 and 15. The same step numbers as employed in FIGS. 7 and 15 refer to the same steps.

After step 220, the routine proceeds to step 130 wherein it is determined whether the average level Lav is greater than a value of a full level minus 19 dB or not. If a YES answer is obtained, then the routine proceeds to step 40 wherein the control circuit 200 provides the control signals a, b, and c of the ON-level to the copyright data generator 100, the spread code generator 117, and the switch 201 to start the copyright data embedding operation. Alternatively, if a NO answer is obtained in step 130, then the routine proceeds to step 30 wherein it is determined whether the peak level Lp is greater than the average level Lav or not. If a NO answer is obtained, then the routine proceeds to step 50 wherein the control circuit 200 provides the control signals a, b, and c of an OFF-level to the copyright data generator 100, the spread code generator 117, and the switch 201 to prohibit the copyright data embedding operation.

Alternatively, if a YES answer is obtained in step 30, then the routine proceeds to step 240 wherein it is determined whether the YES answer in step 30 has been obtained in the first program cycle following a program cycle wherein the NO answer was obtained in step 30 or not. If a YES answer is obtained, then the routine proceeds to step 40. If a NO answer is obtained, then the routine proceeds to step 50.

Figure 19:
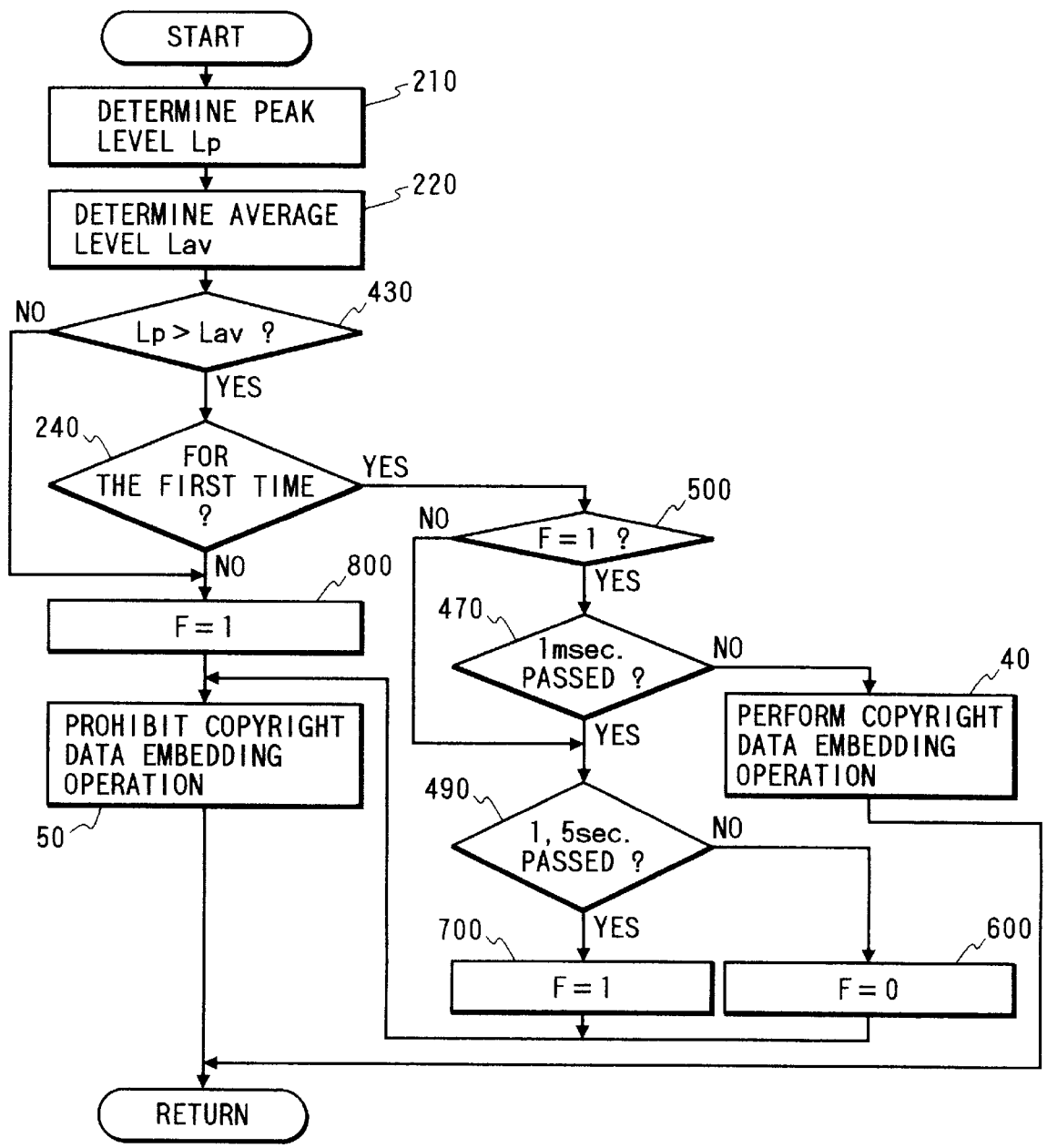
FIG. 19 is a flowchart of a program of a copyright data embedding operation according to the sixth embodiment of the invention.

FIG. 19 shows a program of the copyright data embedding operation according to the sixth embodiment. The same step numbers as employed in the above embodiments refer to the same steps.

If a NO answer is obtained in step 240, then the routine proceeds to step 800 wherein an embedding flag F is set to one (1). The routine proceeds to step 50 wherein the copyright data embedding operation is paused and then returns back to step 210.

Alternatively, if a YES answer is obtained in step 240, then the routine proceeds to step 500 wherein it is determined whether the embedding flag F is one (1) or not. If a YES answer is obtained, then the routine proceeds to step 470 wherein a timer is actuated to determine whether one (1) millisec. has passed or not. If a NO answer is obtained, then the routine proceeds to step 40 to perform the copyright data embedding operation.

Alternatively, if a YES answer is obtained in step 470, then the routine proceeds to step 490 wherein it is determined whether one point five (1.5) sec. has passed or not. If a YES answer is obtained, then the routine proceeds to step 700 wherein the embedding flag F is set to one (1). Alternatively, if a NO answer is obtained, then the routine proceeds to step 600 wherein the embedding flag F is set to zero (0) and proceeds to step 50 to hold the copyright data embedding operation from being started.

If a NO answer is obtained (F=0) in step 500, then the routine proceeds directly to step 490.

Figure 20A:
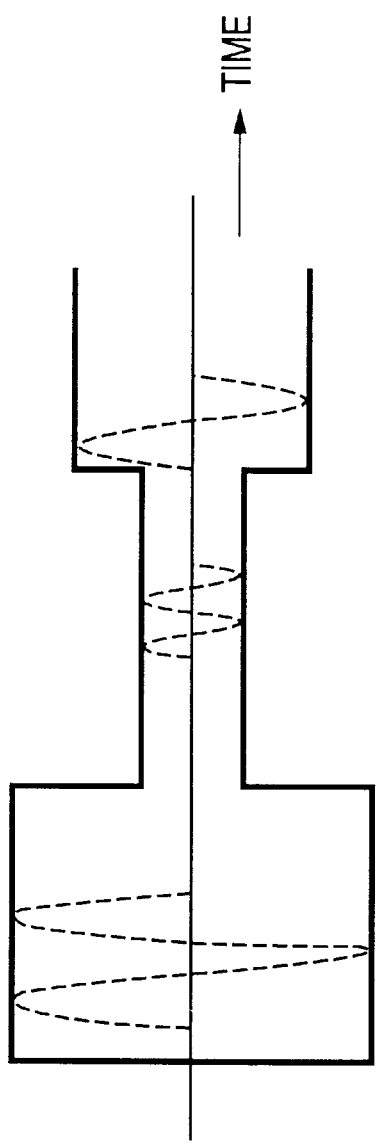
FIG. 20(a) shows a waveform of an original input signal.
Figure 20B:
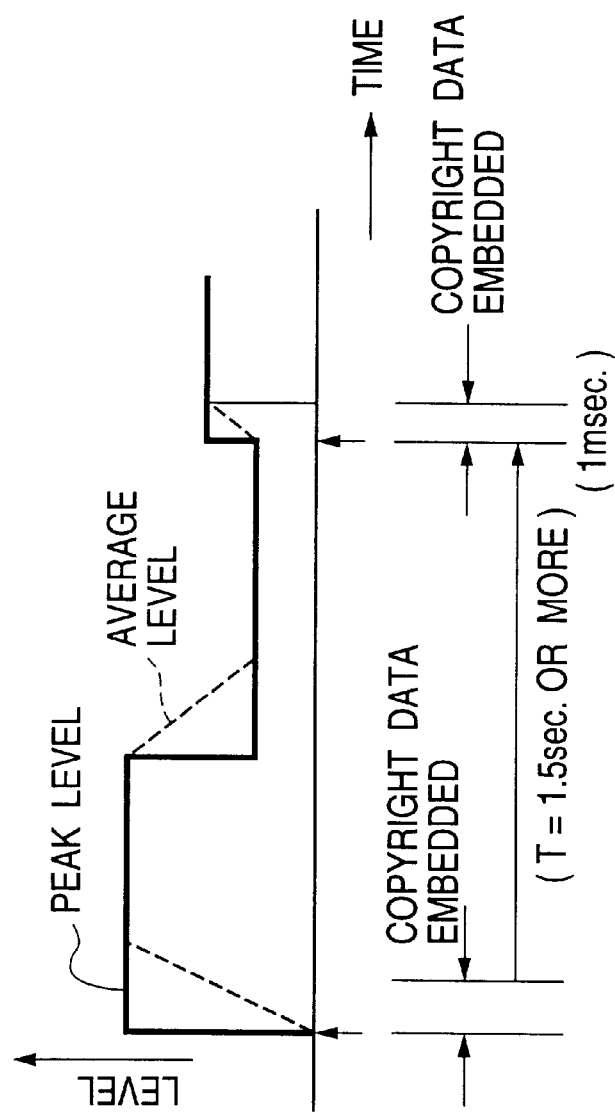
FIG. 20(b) shows the relation among a peak level, an average level of a signal into which the original input signal in FIG. 20(b) is converted in digital form, and the time during which a copyright data signal is embedded.

Specifically, the copyright data is, as shown in FIGS. 20(*a*) and 20(*b*), embedded into an output signal from the A/D converter 31 for one (1) millisec. following a rise of the signal. The copyright data embedding operation is performed a given number of times at intervals longer than at least 1.5 sec. until the contents of the copyright data are all recorded. In other words, the copyright data is embedded into the output from the A/D converter 31 in a burst form. This avoids degradation in quality of analog signals that are reproduced.

Figure 21:
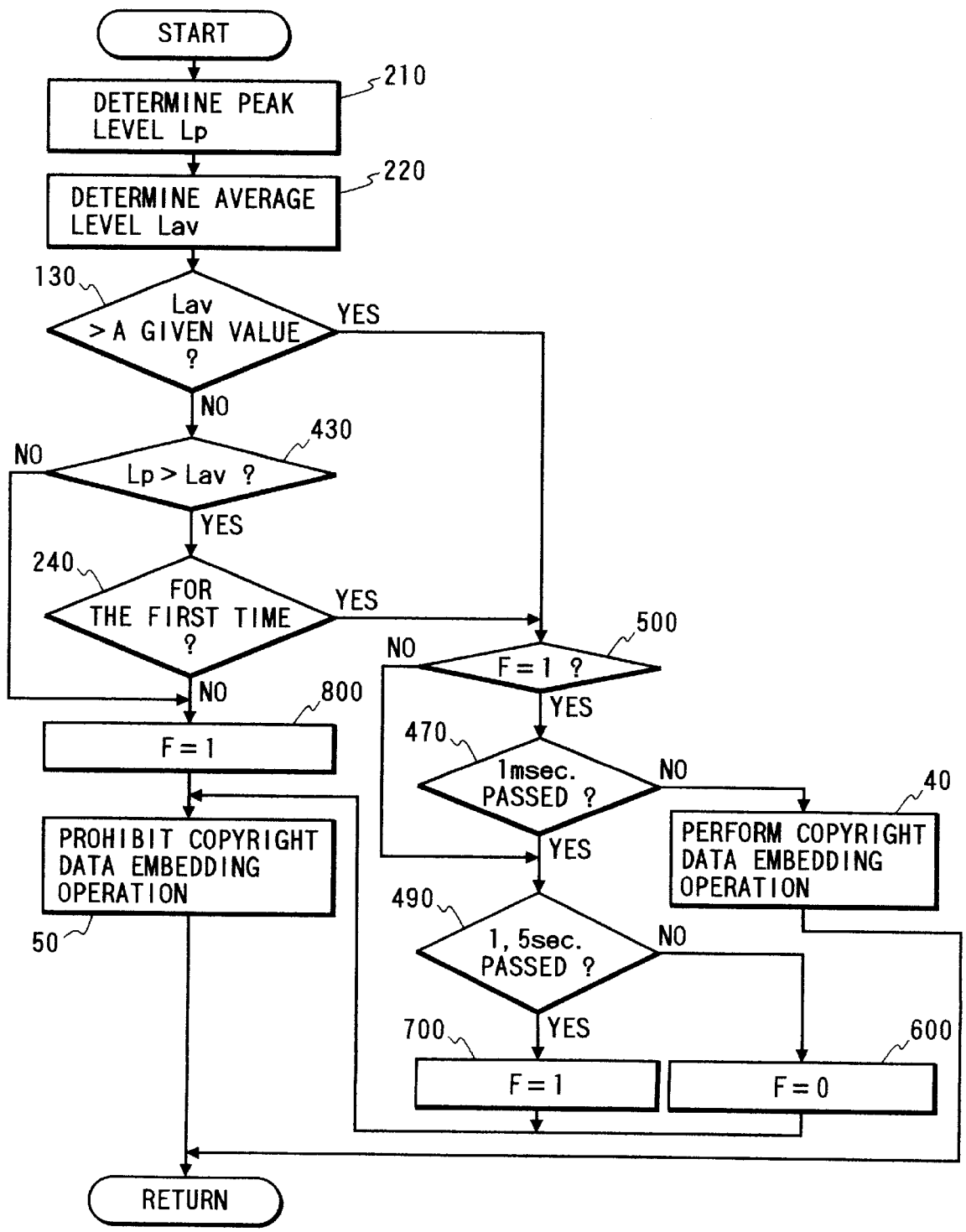
FIG. 21 is a flowchart of a program of a copyright data embedding operation which is a modification of the sixth embodiment.

FIG. 21 shows a program of the copyright data embedding operation which is a modification of the sixth embodiment in FIG. 19. The same step numbers as employed in FIG. 19 refer to the same steps.

After step 220, the routine proceeds to step 130 wherein it is determined whether the average level Lav is greater than a value of a full level minus 19 dB or not. If a YES answer is obtained, then the routine proceeds to step 500. Alternatively, if a NO answer is obtained, then the routine proceeds to step 430. This embodiments, likewise to the sixth embodiment, embeds the copyright data into an output signal from the A/D converter 31 for one (1) millisec. following a rise of the signal a given number of times at intervals longer than at least 1.5 sec.

Figure 22:
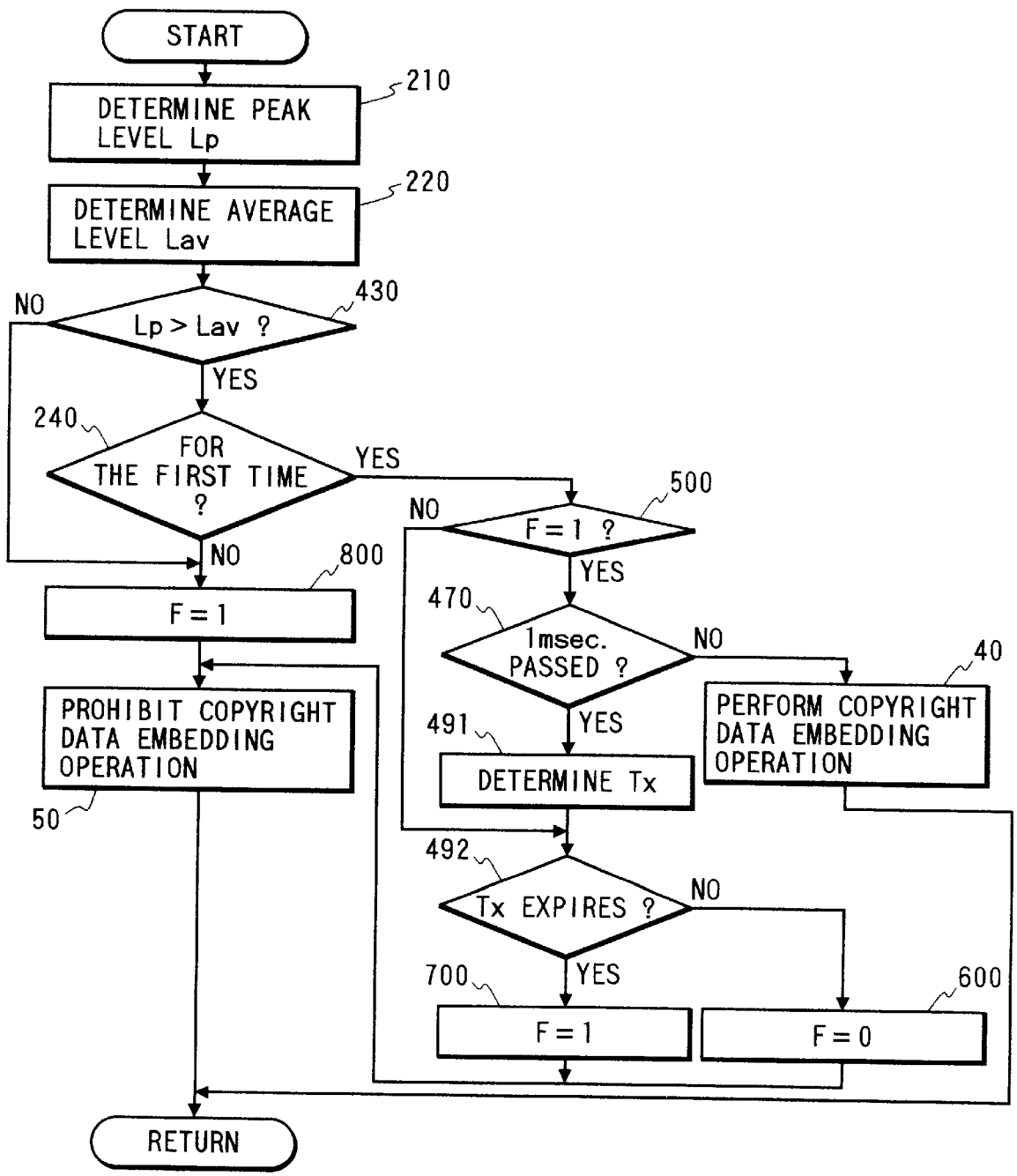
FIG. 22 is a flowchart of a program of a copyright data embedding operation according to the seventh embodiment of the invention.

FIG. 22 shows a program of the copyright data embedding operation according to the seventh embodiment which is a modification of the sixth embodiment in FIG. 19. The same step numbers as employed in FIG. 19 refer to the same steps.

This program is designed to change time intervals or cycles Tx, at random, in which the copyright data embedding operations are performed for preventing the copyright data from being recorded at constant time intervals.

If a YES answer is obtained in step 470 meaning that one (1) millisec. has passed, that is, that the copyright data embedding operation is completed, then the routine proceeds to step 491 wherein the cycle Tx is determined at random within a range from 10 millisec. to 1.5 sec. The routine proceeds to step 492 wherein it is determined whether the cycle Tx has passed or not. If a YES answer is obtained, then the routine proceeds to step 700 wherein the embedding flag F is set to one (1). Alternatively, if a NO answer is obtained, then the routine proceeds to step 600 wherein the embedding flag F is set to zero (0).

Figure 23:
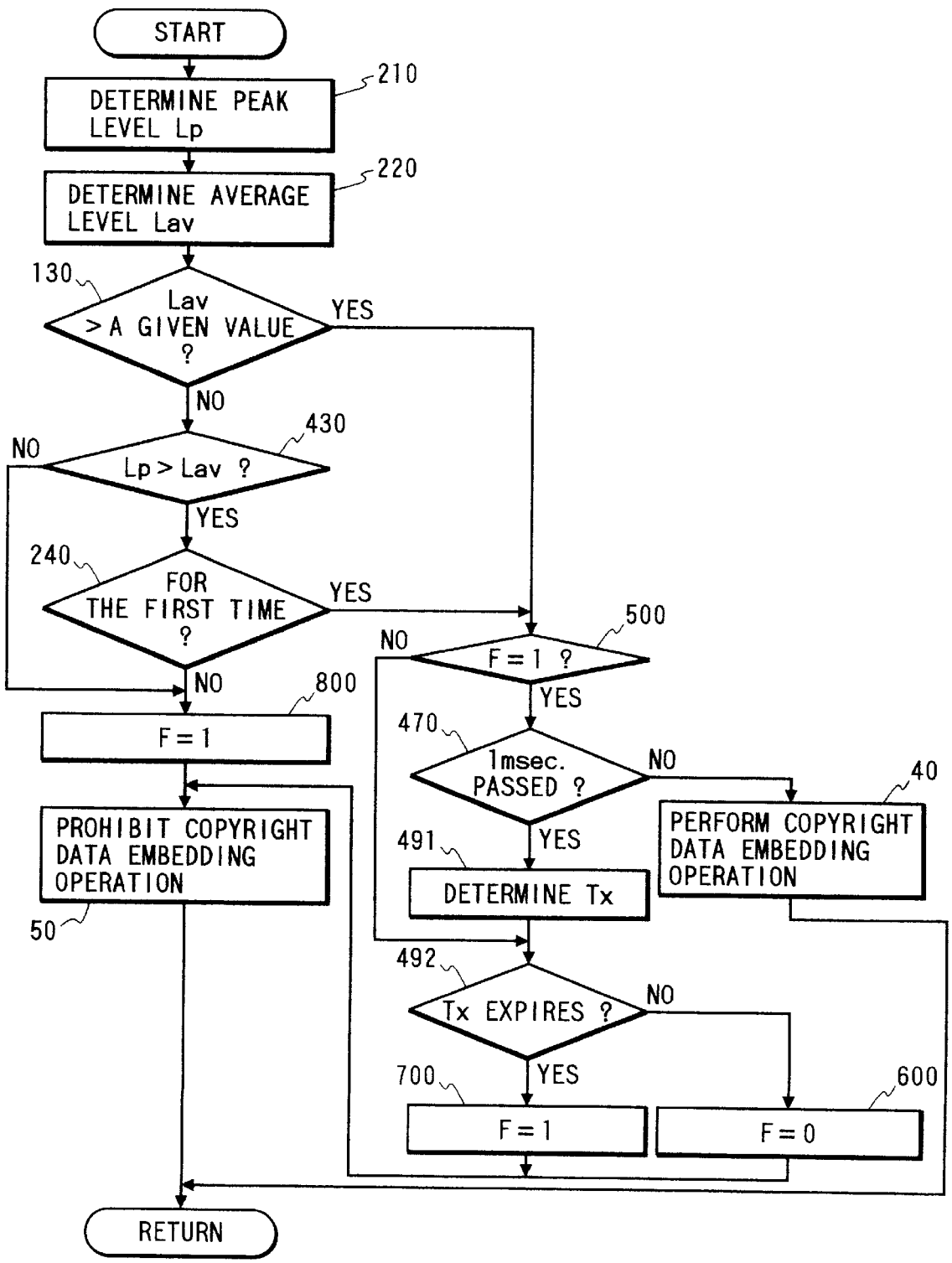
FIG. 23 is a flowchart of a program of a copyright data embedding operation which is a modification of the seventh embodiment in FIG. 22.

FIG. 23 shows a program of the copyright data embedding operation which is a modification of the seventh embodiment in FIG. 22. The same step numbers as employed in FIG. 22 refer to the same steps.

After step 220, the routine proceeds to step 130 wherein it is determined whether the average level Lav is greater than a value of a full level minus 19 dB or not. If a YES answer is obtained, then the routine proceeds to step 500. Alternatively, if a NO answer is obtained, then the routine proceeds to step 430.

Specifically, the copyright data is, as shown in FIG. 24(*b*), embedded into an output signal from the A/D converter 31 each time the level of the signal rises. Additionally, the copyright data is also embedded in different cycles Tx as long as the average level Lav is greater than the value of the full level minus 19 dB.

The decoder 500, as shown in FIG. 8, is designed to output a bit stream read out of a record carrier (e.g., a DVD) as is through the copyright data updating circuit 30, the switch 51, and the bit stream output terminal 52. An identification code is inputted to the decoder/comparator 50 from the terminal 49. The decoder/comparator 50 is responsive to the identification code and the copyright data inputted from the DVD decoding circuit 42 to close the switch 51 and to control the copyright data updating circuit 30.

Specifically, when the identification code is inputted, the decoder/comparator 50 determines whether it is correct or not. If the identification code inputted is determined to be correct, the decoder/comparator 50 checks copy information contained in the copyright data, for example, the number of copy allowable times allowing a copy to be made. If it shows a value other than zero (0), the decoder/comparator 50 controls the copyright data updating circuit 30 to decrement a value contained in the input bit stream indicative of the number of copy allowable times by one (1) and closes the switch 51, allowing the bit stream to be outputted from the bit stream terminal 52. Alternatively, if the number of copy allowable times shows zero (0), the decoder/comparator 50 opens the switch 51 to block the communication between the copyright data updating circuit 30 and the bit stream output terminal 52, thereby prohibiting a copy.

A copy allowable term code may also be recorded on a record carrier in addition to the number of copy allowable times. In this case, the decoder/comparator 50 prohibits a copy when the copy allowable term expires even if the identification code inputted is correct.

Figure 25:
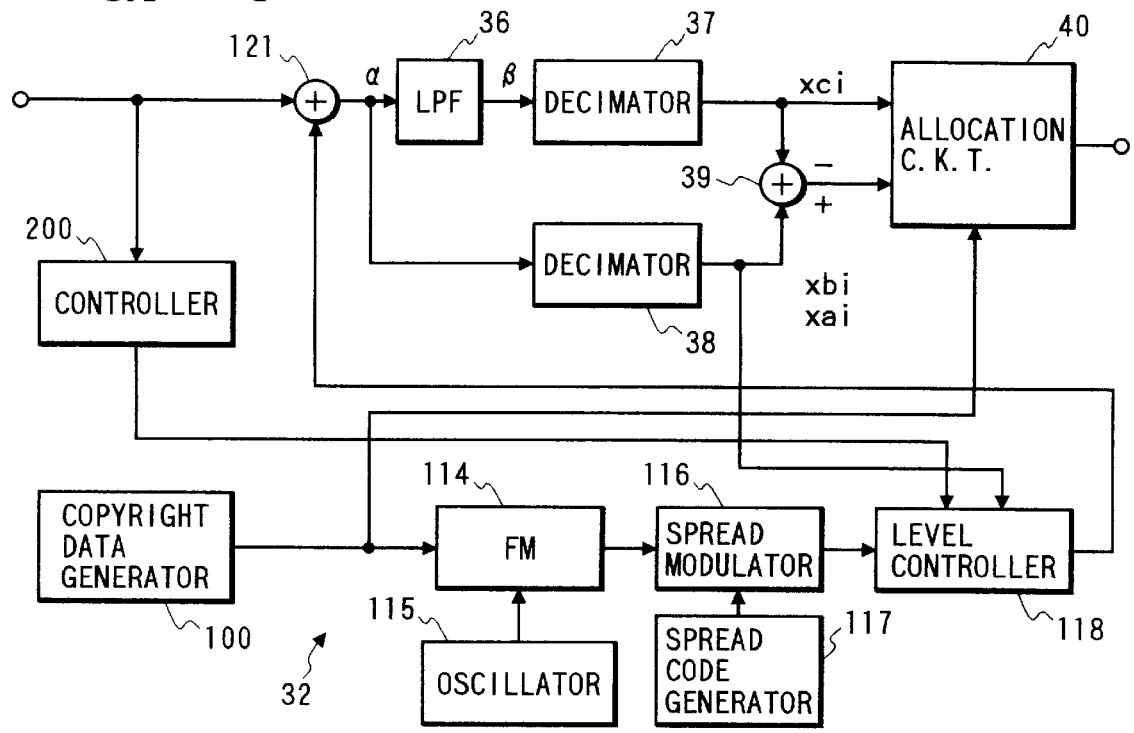
FIG. 25 is a block diagram which shows a signal processing circuit according to the eighth embodiment of the invention.

FIG. 25 shows a circuit structure of the signal processing circuit 32 of the copyright information embedding apparatus 300 according to the eighth embodiment of the invention. The same reference numbers as those in FIG. 2 refer to the same parts, and explanation thereof in detail will be omitted here.

The signal processing circuit 32 of this embodiment, as can be seen from the drawing, does not have the switch 201, and the control circuit 200 directly controls the level control circuit 118. The level control circuit 118 controls the level of an output from the spread modulator 116 based on the frequency of the data stream of xbi and xa1 outputted from the decimating circuit 38 and a control signal from the control circuit 200 and provides it to the adder 121. The adder 121 embeds the level-controlled signal from the level control circuit 118 into an output signal from the A/D converter 31 in a manner, as will be described below in detail.

Figure 26:
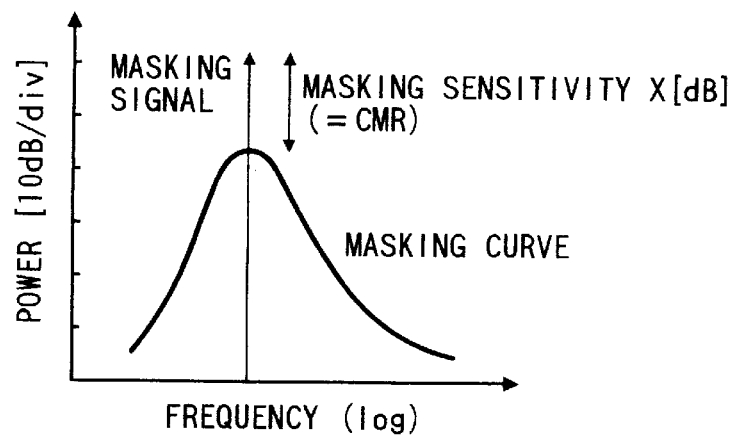
FIG. 26 is a graph which shows an audibility masking effect.

FIG. 26 demonstrates the so-called audibility masking effect. A solid line represents a making curve defined by a maximum level of a signal (code) C to be masked by a signal (music) M. A masking sensitivity X (=CMR) depends upon the characteristics of the making signal M and is known as follows:

about 25 dB when the signal M likes a tone (close to sine wave)

about 3 dB when the signal M likes noise

An actual audio signal will further be close to a tone at lower frequencies, while at higher frequencies, overlap of harmonics of different musical instruments will cause noise. Therefore, the masking sensitivity X (=CMR) may be determined, as shown in FIG. 26 and 27, according to the frequency of the signal M.

Figure 27:
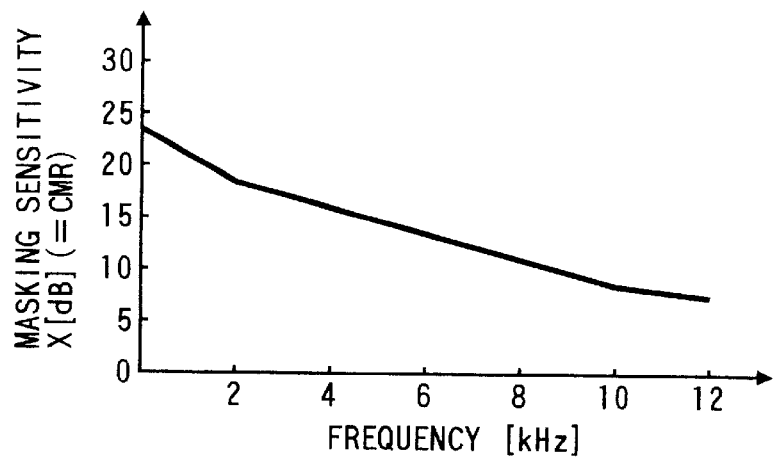
FIG. 27 is a graph which shows the relation between a masking sensitivity and the frequency.
Figure 28:
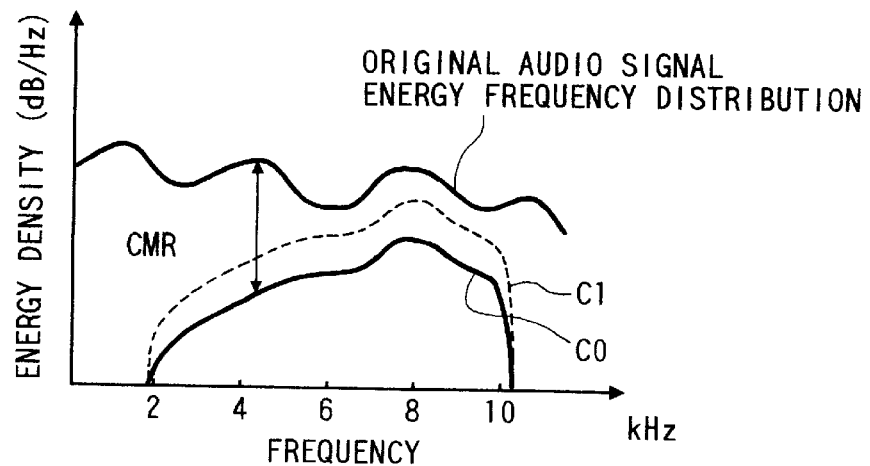
FIG. 28 is a graph which shows a CMR (Code to Music Ratio) between an original signal and a copyright data signal in terms of the frequency.

Based on the above fact, the level control circuit 118 decreases the level of a modulated signal (i.e., the signal C) of the copyright data down to at least a level, as shown by a solid line C0 in FIG. 28, which is an inaudible level lower than that of an original audio signal (i.e., the signal M) by the CMR (Code to Music Ratio) in the psychoacoustic model, as shown in FIG. 27, based on the frequency of the data stream of xbi and xa1 outputted from the decimating circuit 38. The adder 121 then, as described above, embeds the level-controlled signal from the level control circuit 118 into an output signal from the A/D converter 31.

Figure 29:
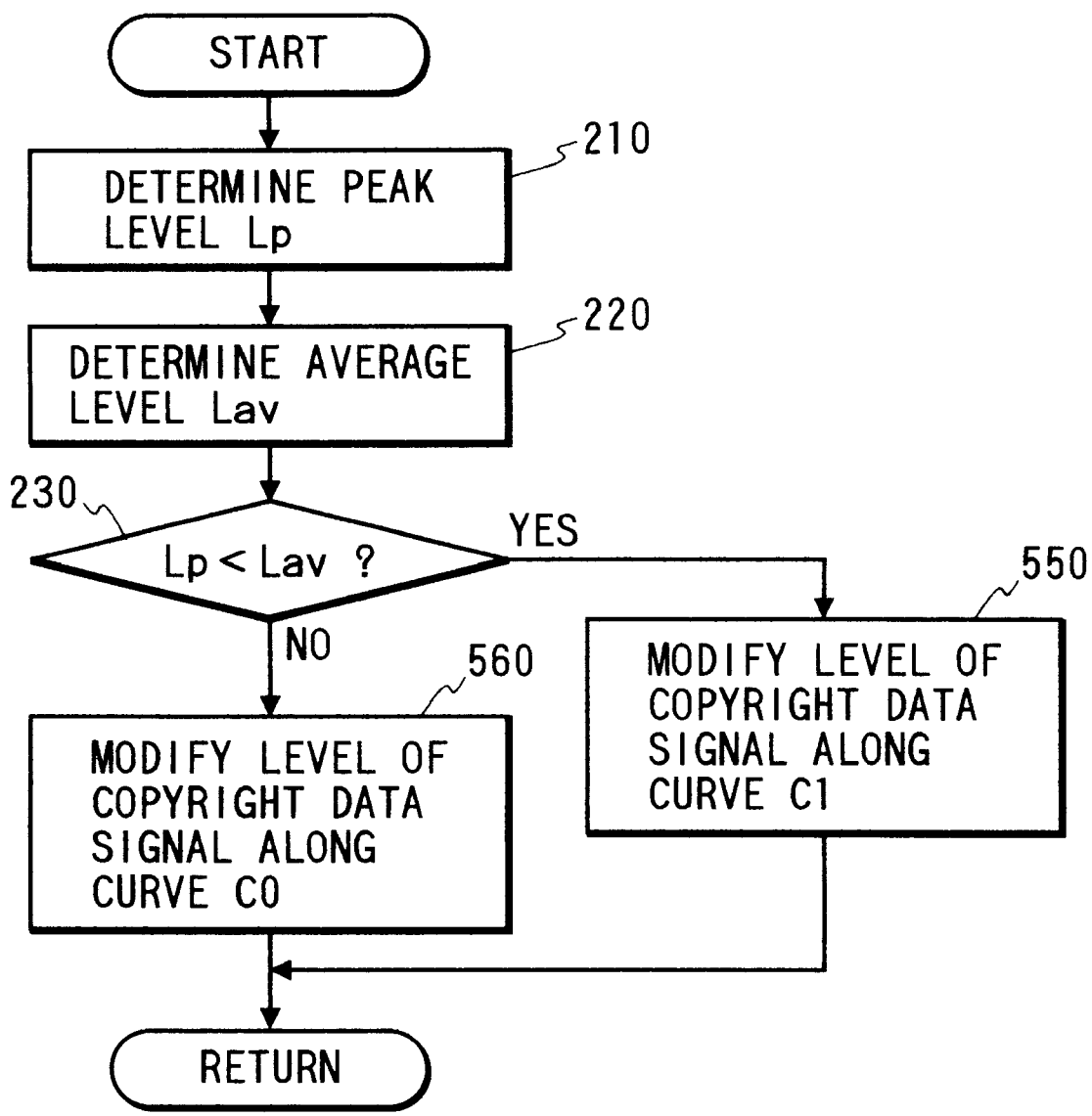
FIG. 29 is a flowchart of a program of a copyright data embedding operation according to the ninth embodiment.

FIG. 29 shows a program of the copyright data embedding operation performed by the control circuit 200 of the copyright information embedding apparatus according to the ninth embodiment. The same step numbers as employed in the above embodiments refer to the same steps, and explanation thereof in detail will be omitted here.

In step 230, it is determined whether the peak level Lp is smaller than the average level Lav or not. If a NO answer is obtained, then the routine proceeds to step 560 wherein the level control circuit 118 detects the frequency of the original audio signal M (i.e., the frequency of the data stream of xbi and xa1 outputted from the decimating circuit 38) and brings the level of a modulated signal outputted from the spread modulator 116 along the line C0, as shown in FIG. 28, according to the frequency detected. Alternatively, if a YES answer is obtained in step 230, then the routine proceeds to step 550 wherein the level control circuit 118 brings the level of the modulated signal from the spread modulator 116 along a broken line C1 higher in level (i.e., the energy density (dB/Hz)) than the line C0.

Figure 30A:
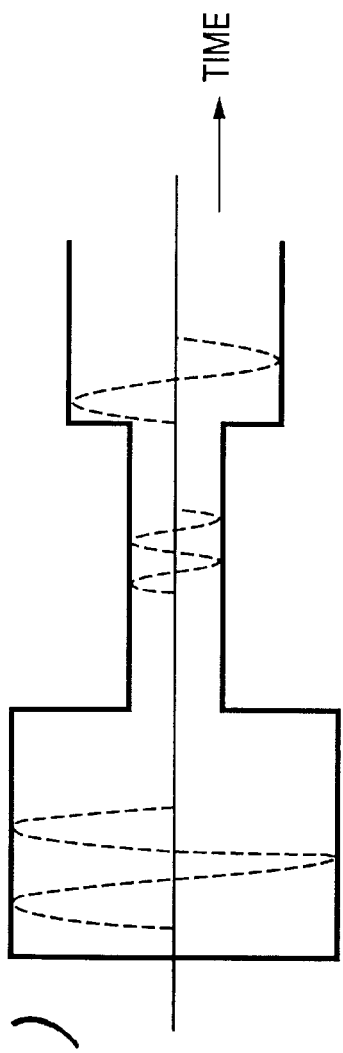
FIG. 30(a) shows a waveform of an original input signal.
Figure 30B:
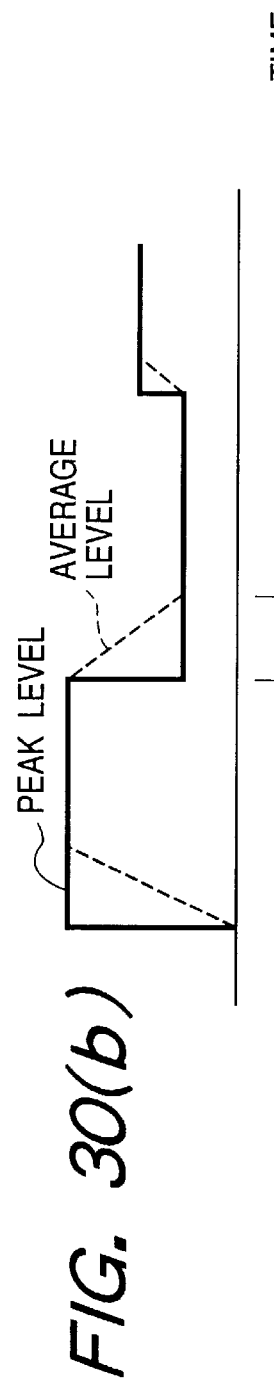
FIG. 30(b) shows the relation between a peak level and an average level of a signal into which the original input signal in FIG. 30(a) is converted in digital form.
Figure 30C:
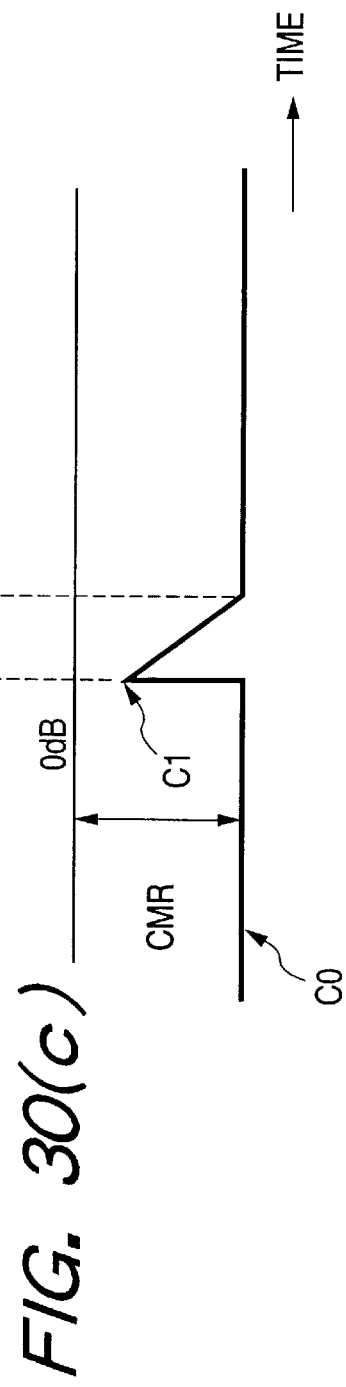
FIG. 30(c) shows a variation in level of a copyright data signal.

Specifically, the modulated signal outputted from the spread modulator 116 is, as can be seen in FIGS. 30(a) to 30(c), increased in level above the line C0 for a period of time during which the average level Lav is decreased to agree with the peak level Lp after the modulated signal drops in level.

Figure 31:
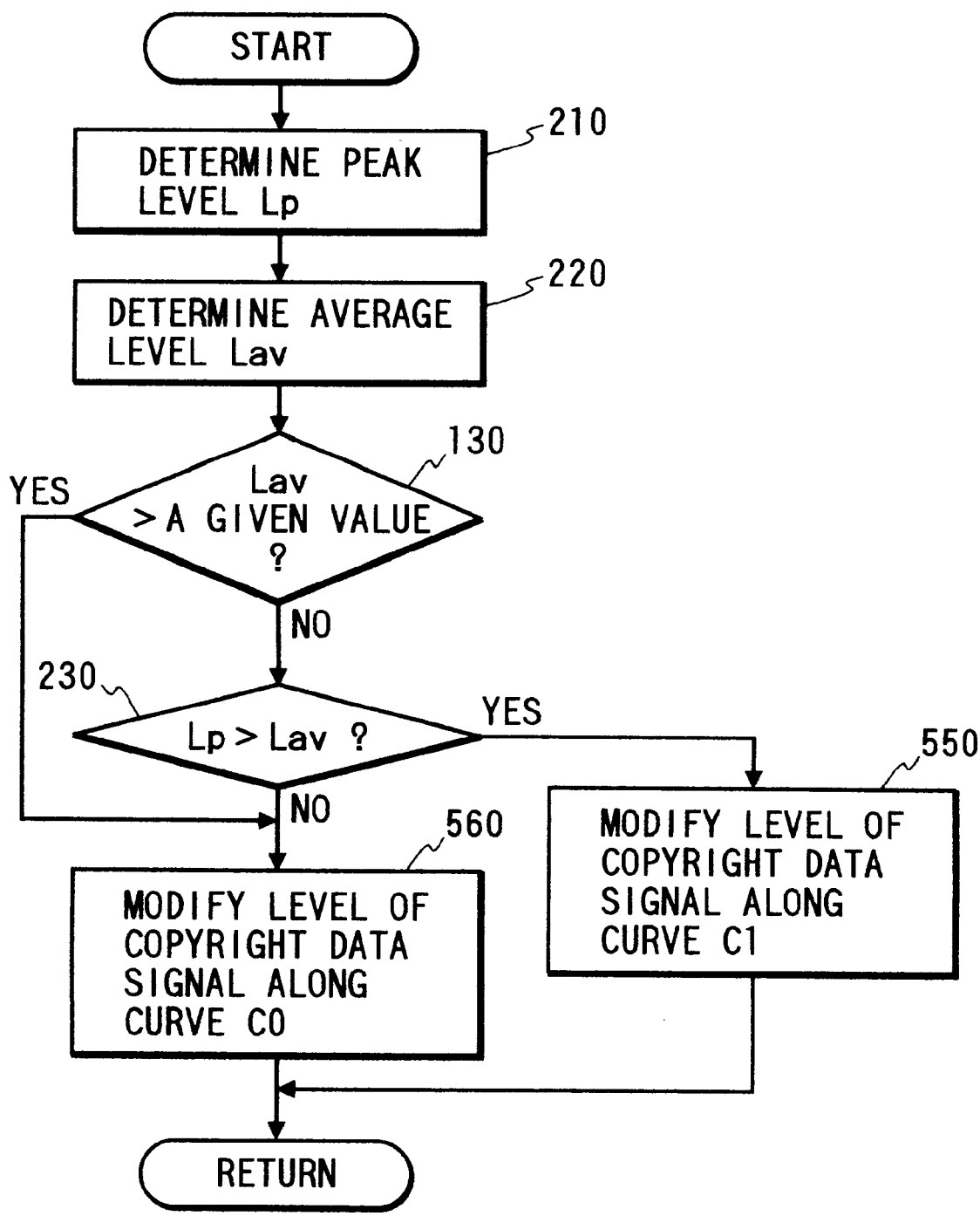
FIG. 31 is a flowchart of a program of a copyright data embedding operation which is a modification of the ninth embodiment shown in FIG. 29.

FIG. 31 shows a program of the copyright data embedding operation which is a modification of the one shown in FIG. 29. The same step numbers as employed in the above embodiments refer to the same steps.

Figure 34:
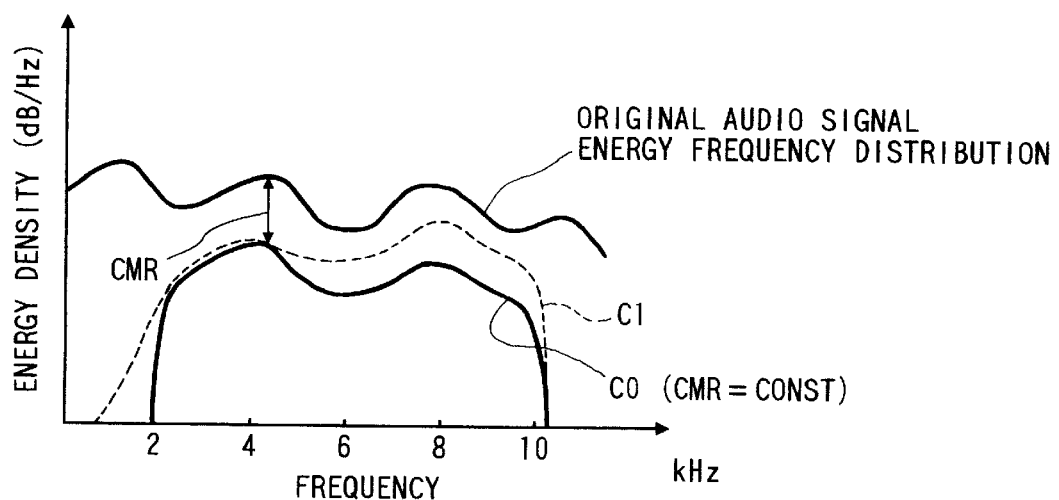
FIG. 34 shows another CMR between an original signal and a copyright data same as FIG. 28.

After step 220, the routine proceeds to step 130 wherein it is determined whether the average level Lav is greater than a value of a full level minus 19 dB or not. If a YES answer is obtained, then the routine proceeds to step 560 wherein the level control circuit 118 brings the level of an output from the spread modulator 116 along the line C0, as shown in FIG. 28 or FIG. 34, according to the frequency of the original audio signal M. Alternatively, if a YES answer is obtained in step 230, then the routine proceeds to step 550 wherein the level control circuit 118 brings the level of the output from the spread modulator 116 along the broken line C1 in FIG. 28 or FIG. 34.

Figure 32:
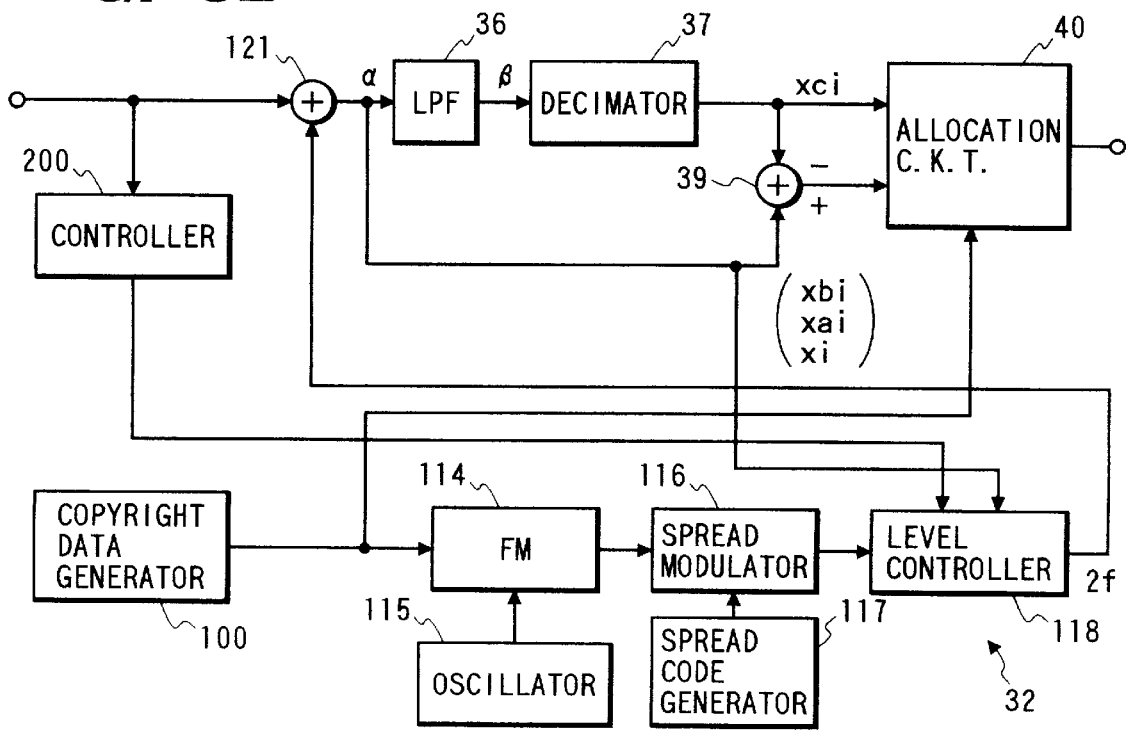
FIG. 32 is a circuit diagram which shows a modification of a signal processing circuit of the eighth embodiment shown in FIG. 25.

FIG. 32 shows a modification of the signal processing circuit 32 of the copyright information embedding apparatus 300 shown in FIG. 25.

The signal processing circuit 32, as can be seen from the drawing, does not have the decimating circuit 38 which removes the data xi from the input signal. Specifically, the difference calculating circuit 39 determines difference data $\Delta 1i$, $\Delta 2i$, and $\Delta 3i$, as shown below.

$$xbi-xci=\Delta 1i$$

$$xai-xci=\Delta 2i$$

$$xi-xci=\Delta 3i$$

The allocation circuit 40 packs the data stream of xci, $\Delta 1i$, $\Delta 2i$, and $\Delta 3i$ and the copyright data together and outputs it. The copyright data is, similar to the eighth embodiment, embedded into the data stream of xci, $\Delta 1i$, $\Delta 2i$, and $\Delta 3i$ intermittently.

An decoder decoding a signal coded by the copyright information embedding apparatus including the signal processing circuit 32 in FIG. 32 has the same circuit structure as the one shown in FIG. 12.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A copyright information embedding apparatus comprising:
    A/D conversion means for converting an analog audio signal into a digital signal;
    modulation means for modulating a copyright data signal for said digital signal using spectrum spread;
    level detection means for detecting a variation in level of said digital signal; and
    a copyright data embedding circuit embedding the copyright data signal into the digital signal when the variation in level of said digital signal detected by said level detection means shows a preselected variation.

2. A copyright information embedding apparatus as set forth in claim 1, wherein said copyright data embedding circuit embeds the copyright data into the digital signal during a time when a level of the digital signal is decreased.

3. A copyright information embedding apparatus as set forth in claim 1, wherein said copyright data embedding circuit embeds the copyright data into the digital signal during a time when a level of the digital signal is increased.

4. A copyright information embedding apparatus as set forth in claim 1, wherein said copyright data embedding circuit records the copyright data into the digital signal intermittently.

5. A copyright information embedding apparatus as set forth in claim 1, wherein said copyright data embedding circuit records the copyright data into the digital signal in random cycles.

6. A copyright information embedding apparatus as set forth in claim 1, wherein said copyright data embedding circuit also embeds the copyright data into the digital signal when a level of the digital signal sampled over a preselected period of time is greater than a given value.

7. A record carrier comprising:
    a digital signal into which an analog audio signal is converted; and
    a copyright data signal carrying copyright information about said digital signal, modulated with spectrum spread, said copyright data signal being embedded into said digital signal each time a variation in level of said digital signal shows a preselected variation.

8. A record carrier as set forth in claim 7, wherein the copyright data signal is embedded into the digital signal during a time when a level of the digital signal is decreased.

9. A record carrier as set forth in claim 7, wherein the copyright data signal is embedded into the digital signal during a time when a level of the digital signal is increased.

10. A record carrier as set forth in claim 7, wherein the copyright data signal is embedded into the digital signal intermittently.

11. A record carrier as set forth in claim 7, wherein the copyright data signal is embedded into the digital signal in random cycles.

12. A record carrier as set forth in claim 7, wherein the copyright data signal is also embedded into the digital signal when a level of the digital signal sampled over a preselected period of time is greater than a given value.

13. A record carrier as set forth in claim 7, further comprising a second copyright data signal identical with said copyright data signal which is recorded on a subcode of said digital signal.

14. A record carrier as set forth in claim 7, further comprising a second copyright data signal identical with said copyright data signal which is recorded on a copyright information management area defined on the record carrier.

15. A copyright information embedding apparatus comprising:
   A/D conversion means for converting an analog audio signal into a digital signal;
   modulation means for modulating a copyright data signal carrying copyright information about said digital signal using spectrum spread;
   frequency detection means for detecting a frequency of said digital signal; and
   a copyright data embedding circuit embedding the copyright data signal into the digital signal at a preselected power level different from that of said digital signal.

16. A copyright information embedding apparatus as set forth in claim 15, wherein said copyright data embedding circuit detects a variation in level of said digital signal and changes the power level according to the variation in level detected.

17. A copyright information embedding apparatus as set forth in claim 16, wherein said copyright data embedding circuit embeds the copyright data signal into the digital signal at the preselected power level regardless of the variation in level of said digital signal when a level of the digital signal sampled over a preselected period of time is greater than a given value.

18. A record carrier comprising:
   a digital signal into which an analog audio signal is converted; and
   a copyright data signal carrying copyright information about said digital signal, modulated with spectrum spread, said copyright data signal being embedded into said digital signal at a preselected power level different from that of said digital signal.

19. A record carrier as set forth in claim 18, wherein the preselected power level is changed according to a variation in level of said digital signal.

20. A record carrier as set forth in claim 19, wherein the copyright data signal is embedded into the digital signal at the preselected power level regardless of the variation in level of said digital signal when a level of the digital signal sampled over a preselected period of time is greater than a given value.

21. A record carrier as set forth in claim 18, further comprising a second copyright data signal identical with said copyright data signal, recorded on a subcode of said digital signal.

22. A record carrier as set forth in claim 18, further comprising a second copyright data signal identical with said copyright data signal, recorded on a copyright information management area defined on the record carrier.

23. A copyright information embedding method comprising the steps of:
   A/D-converting an analog audio signal into a digital signal;
   modulating a copyright data signal for said digital signal using spectrum spread;
   detecting a variation in level of said digital signal; and
   embedding the copyright data signal into the digital signal when the variation in level of said digital signal detected by said level detection means shows a preselected variation.

24. A copyright information embedding method comprising the steps of:
   A/D-converting an analog audio signal into a digital signal;
   modulating a copyright data signal carrying copyright information about said digital signal using spectrum spread;
   detecting a frequency of said digital signal; and
   embedding the copyright data signal into the digital signal at a preselected power level different from that of said digital signal.

25. A copyright information embedding apparatus comprising:
   A/D conversion means for converting an analog audio signal into a digital signal;
   modulation means for modulating a copyright data signal for said digital signal using spectrum spread;
   level detection means for detecting a level of said digital signal; and
   a copyright data embedding circuit embedding the copyright data signal into the digital signal when the level of said digital signal detected by said level detection means lies within a preselected range.

* * * * *

UNITED STATES PATENT AND TRADEMARK OFFICE
CERTIFICATE OF CORRECTION

PATENT NO. : 5,960,398
DATED : September 28, 1999
INVENTOR(S) : FUCHIGAMI et al

It is certified that error appears in the above-identified patent and that said Letters Patent is hereby corrected as shown below:

Assignee: Victor Company of Japan, Ltd.
Yokohama, Japan

Signed and Sealed this

Twenty-ninth Day of August, 2000

Attest:

Q. TODD DICKINSON

Attesting Officer

Director of Patents and Trademarks